US011892817B2

(12) United States Patent
Jacobs, II et al.

(10) Patent No.: US 11,892,817 B2
(45) Date of Patent: Feb. 6, 2024

(54) METHODS AND SYSTEMS FOR ORDERING EXPEDITED PRODUCTION OR SUPPLY OF DESIGNED PRODUCTS

(71) Applicant: Desprez, LLC, New London, NH (US)

(72) Inventors: James L. Jacobs, II, Amherst, NH (US); Steven M. Lynch, Hudson, NH (US)

(73) Assignee: Desprez, LLC

( * ) Notice: Subject to any disclaimer, the term of this patent is extended or adjusted under 35 U.S.C. 154(b) by 0 days.

(21) Appl. No.: 17/878,021

(22) Filed: Jul. 31, 2022

(65) Prior Publication Data
US 2022/0365510 A1     Nov. 17, 2022

Related U.S. Application Data

(63) Continuation of application No. 17/104,746, filed on Nov. 25, 2020, now Pat. No. 11,474,498, which is a
(Continued)

(51) Int. Cl.
G05B 19/4097     (2006.01)

(52) U.S. Cl.
CPC .................. G05B 19/4097 (2013.01); G05B 2219/35134 (2013.01)

(58) Field of Classification Search
None
See application file for complete search history.

(56) References Cited

U.S. PATENT DOCUMENTS

2005/0015305 A1* 1/2005 Agarwal ............ G06Q 30/0625
705/26.62
2006/0253214 A1* 11/2006 Gross ..................... G06F 30/00
705/26.1
(Continued)

OTHER PUBLICATIONS

L. Zhang and Q. Xu, "Designing an integrated order fulfillment system for configure-to-order production," 2011 IEEE International Conference on Industrial Engineering and Engineering Management, Singapore, 2011, pp. 1810-1814, (Year: 2011).*

*Primary Examiner* — Chesiree A Walton
(74) *Attorney, Agent, or Firm* — Caldwell Intellectual Property Law

(57) ABSTRACT

A method of enabling expedited manufacture of one or more instantiations of a structure modeled as a 3D computer model, the method implemented on one or more computer devices including displaying one or more user selectable expedited manufacturing reservation options for a plurality of requests for manufacture, generating a prompt to select a user selectable expedited manufacturing reservation option, receiving an expedited manufacturing, storing the expedited manufacturing reservation, receiving a request for manufacture of one or more instantiations of a structure modeled in an associated 3D computer model from a user, compare one or more of the requests for manufacture and one or more aspects of the associated 3D computer model with the expedited manufacturing reservation, determining an applicability of the expedited manufacturing reservation to the request for manufacture, calculating a total time to complete the request for manufacture, and presenting the total time to complete the request for manufacture.

20 Claims, 13 Drawing Sheets

Related U.S. Application Data continuation of application No. 14/929,149, filed on Oct. 30, 2015, now Pat. No. 11,415,961.

(60) Provisional application No. 62/073,516, filed on Oct. 31, 2014, provisional application No. 62/073,481, filed on Oct. 31, 2014.

(56) References Cited

U.S. PATENT DOCUMENTS

| | | | |
|---|---|---|---|
| 2011/0047140 A1* | 2/2011 | Free | G06F 30/00 707/706 |
| 2011/0172794 A1* | 7/2011 | Sohmshetty | G06F 30/15 700/97 |
| 2015/0127131 A1* | 5/2015 | Herrman | G06Q 30/0283 700/98 |

* cited by examiner

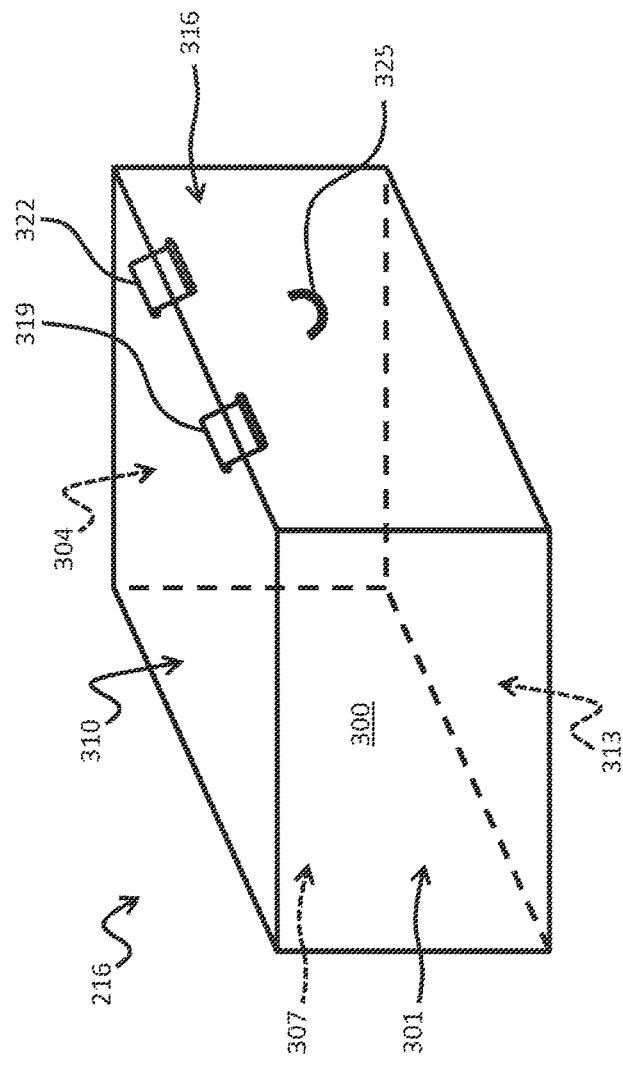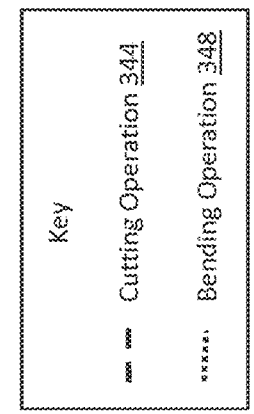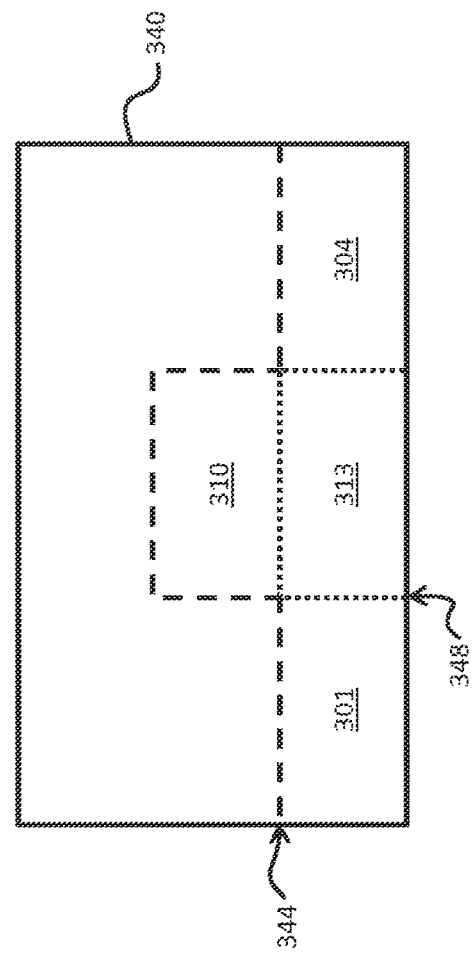
FIG. 3A
FIG. 3B

| "Best" Criteria 605 | CAD Data 610 | User Data 615 | Supplier Data 620 | Algorithm 625 | Supplier 1 Evaluation Data Points 630A | Supplier 2 Evaluation Data Points 630B | Supplier n Evaluation Data Points 630N |
|---|---|---|---|---|---|---|---|
| Complexity 229 | Number of Production Operations | None | Number operations maximum | Is number of manufacturing operations ≤ max. number of operations Y/N | Y | N | Y |
| Capability 232 | Types of Production Operations | None | Supplier Production Capabilities | Is each Operation matched by a Capability Y/N | Y | N | N |
| Capability 232A | Finishing options | None | Supplier Finishing Capabilities | Is each finishing option matched by a Capability Y/N | Y | N | Y |
| Quality 235 | None | None | Quality Ranking | Provide Quality Rankings | 4 | 3 | 3 |
| Shipping 238 | Dimensions, weight | Shipping type, Distance, Discounts | Carriers Serving Supplier that can ship desired package | For each eligible carrier, add 1 | 5 | 3 | 2 |
| Lead Time 241 | No. and Type of Production Operations | Quantity, Expedited Production Option Chosen | Expedited Production Options and Production Times | Number of Days Required for Chosen Expedited Production Option | 1 days | 4 days | 3 days |
| Logistics 244 | No. and Type of Production Operations | Quantity | Shipping info, downstream supplier info | Determine total price change from shipping "tree" | +$200 | $0 | $0 |
| Price 226 | No. and Type of Production Operations | Quantity | Supplier Production Capabilities and Associated Prices | Prices | $1.50 | $2.00 | $1.85 |

METHODS AND SYSTEMS FOR ORDERING EXPEDITED PRODUCTION OR SUPPLY OF DESIGNED PRODUCTS

RELATED APPLICATION DATA

This application is a continuation of U.S. Nonprovisional patent application Ser. No. 17/104,746, filed on Nov. 25, 2020 and titled "METHODS AND SYSTEMS FOR ORDERING EXPEDITED PRODUCTION OR SUPPLY OF DESIGNED PRODUCTS" which is a continuation of U.S. Nonprovisional patent application Ser. No. 14/929,149, filed on Oct. 30, 2015 and titled "Automated Correlation of Modeled Product and Preferred Manufacturers" which claims the benefit of priority of U.S. Provisional Patent Application Ser. No. 62/073,481, filed on Oct. 31, 2014 and titled "Automated Correlation Of Modeled Product And Preferred Manufacturers and U.S. Provisional Patent Application Ser. No. 62/073,516, filed on Oct. 31, 2014 and titled "Automated Correlation Of Modeled Product And Preferred Component Manufacturers." Each of the above referenced applications is incorporated herein in its entirety.

FIELD OF THE INVENTION

The present invention generally relates to the field of manufacturing. More particularly, the present invention is directed to ordering expedited production or supply of designed products.

BACKGROUND

Computer-aided design (CAD) programs are typically utilized to create, model, and optimize the design of a product or article for subsequent manufacture, typically by creating a three-dimensional (3D) representation (or model) of the designed product. Modeling software programs typically include a user interface for enabling a user to input design requirements, constraints, required performance criteria, testing criteria, and required elements or materials for the designed product.

Once a product is designed, designers and engineers then need to consider how it may be manufactured. If the design was made specifically for a particular manufacturer, such as an in-house manufacturer, then amongst the constraints imposed on product design are those that arise from capabilities and other attributes of the specific manufacturer in question. The output of the modeling software program may be used to in turn drive a corresponding computer-aided manufacturing (CAM) program that reflects such capabilities and other attributes for a manufacturer in question, so as to enable manufacture the designed products.

However, to ensure fuller design freedom by reducing design constraints imposed by a specific manufacturer, the question arises of how to select a manufacturer in the absence of such manufacturer-specific constraints. After a design is complete, a designer or other user typically then seeks out one or more suppliers (or fabricators) to which a user may send a request for pricing (hereinafter, "RFP") in order to obtain a price associated with fabricating a designed product or structure. The process of sending an RFP to one or more of suppliers tends to create additional work and expense and may cause delays, as this process typically requires a user to send the RFP manually to the one or more suppliers, for example, via e-mail or postal mail. A user may have to wait days or longer before receiving a corresponding price from any one supplier, which may result in unacceptable delays in the fabrication process. Further, each supplier may use different methods, algorithms, and/or inputs to produce a price for a given RFP, which may inhibit users' ability to determine how particular elements or conditions of a design influence prices.

SUMMARY OF THE DISCLOSURE

In one implementation, the present disclosure is directed to a method of enabling expedited manufacture of one or more instantiations of a structure modeled as a 3D computer model, the method implemented on one or more computer devices and including displaying, by one or more computer devices, one or more user selectable expedited manufacturing reservation options for a plurality of requests for manufacture, generating, by the one or more computer devices, a prompt to select a user selectable expedited manufacturing reservation option from the displayed one or more selectable expedited manufacturing reservation, receiving, at the one or more computer devices, an expedited manufacturing reservation corresponding to the selected user selectable expedited manufacturing reservation option, wherein the expedited manufacturing reservation applies to a plurality of requests for manufacture, storing, at the one or more computer devices, the expedited manufacturing reservation, receiving, at the one or more computer devices, a request for manufacture of one or more instantiations of a structure modeled in an associated 3D computer model from a user, automatedly comparing, via at least one of the one or more computer devices, one or more of the requests for manufacture and one or more aspects of the associated 3D computer model with the expedited manufacturing reservation, determining, via the one or more computer devices and as function of the automated comparing, an applicability of the expedited manufacturing reservation to the request for manufacture, calculating, via at least one of the one or more computer devices, a total time to complete the request for manufacture. and presenting, via at least one of the one or more computer devices, the total time to complete the request for manufacture.

In another implementation, a system configured to enable expedited manufacture of one or more instantiations of a structure modeled as a 3D computer model, the system comprising one or more computer devices configured to, display, by one or more computer devices, to a user one or more user selectable expedited manufacturing reservation options for a plurality of requests for manufacture, generate, by the one or more computer devices, a prompt to select a user selectable expedited manufacturing reservation option from the displayed one or more selectable expedited manufacturing reservation, receive, at the one or more computer devices, an expedited manufacturing reservation corresponding to the selected user selectable expedited manufacturing reservation option, wherein the expedited manufacturing reservation applies to a plurality of requests for manufacture, store, at the one or more computer devices, the expedited manufacturing reservation, receive, at the one or more computer devices, a request for manufacture of one or more instantiations of a structure modeled in an associated 3D computer model from a user, automatedly compare, via at least one of the one or more computer devices, one or more of the requests for manufacture and one or more aspects of the associated 3D computer model with the expedited manufacturing reservation, determine, via the one or more computer devices and as function of the automated comparing, an applicability of the expedited manufacturing reservation to the request for manufacture, calculate, via at least one of the one or more computer devices, total time to complete the request for manufacture, and present, via at least one of the one or more computer devices, the total time to complete the request for manufacture.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

The appended drawings illustrate various aspects of the disclosure. However, it should be understood that the scope of the disclosure is not limited to the precise arrangements and instrumentalities shown in the drawings, wherein:

FIG. 3A is a schematic perspective view of a simplified 3D computer model for a rectangular drawer for illustrating aspects of the present invention;

FIG. 3B is a top view of a workpiece used to partially form the exemplary drawer of FIG. 3A;

FIG. 6 illustrates a portion of exemplary data stored by in the best supplier data table of FIG. 2A;

DETAILED DESCRIPTION

Figure 1A:
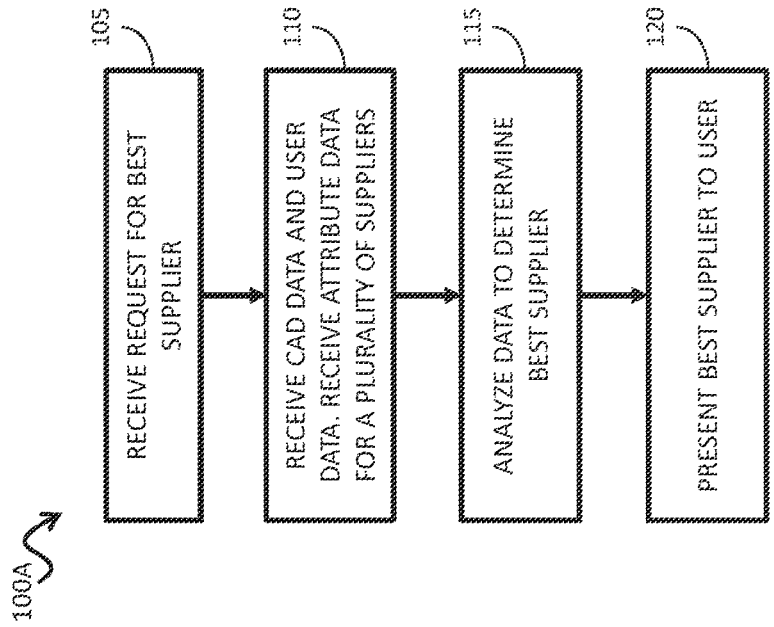
FIG. 1A is a high-level flowchart of an exemplary method of correlating 3D computer models to suitable suppliers.

In the descriptions to follow, a "structure" (or the "product" that is designed) may be any object or part having a particular geometry. A 3D computer "model" may be a virtual representation of a structure and may be created using an appropriate CAD program, such as SolidWorks® (registered trademark of Dassault Systemes), AutoCAD, zwCAD from ZWCAD Software Co, TurboCAD from IMSI/Design LLC, and/or from image and video data. A "designer" or "user" may be the designer of a 3D computer model, a purchaser, an agent of the purchaser, a consumer, a home user, or a customer, among others. Examples of a structure to be modeled include a piece of sheet metal, a solid cube, a cylindrical pipe, an injection molded plastic toy, an article of clothing such as a shirt made of cotton, and an assembly of various parts such as a vehicle, among others. A project (or design) may refer to a CAD model of a part or an assembly of CAD models of parts that may be a virtual representation of a particular structure and may be created using one or more appropriate CAD programs. In particular, while the disclosure is described with reference to CAD models for sheet metal-based products, it is applicable to other types of products.

In the description to follow, flowcharts are used to indicate the sequence of steps of the present CAD method. These flowcharts indicate corresponding sequences of computer code that accomplish the depicted method steps, which may be instantiated in one or more modules of code. The present CAD method and system may be embodied in one of several ways. All of the code modules may be included in a 3D CAD program, such as those set forth above. Alternatively, one or more of the code modules described herein may interact with a CAD program through its application program interface (API). Any of such code modules integrated into an existing CAD product may be written in an applicable programing language for CAD products, such as LISP. A person of ordinary skill in the art may readily recognize that code sequences that work with CAD products through their APis may be embodied in any computer language, such as Java or C++.

In general, in accordance with the present CAD method and system, a database may be populated with information ("attributes" or "attribute data") from one or more suppliers, which may include one or more of (i) "capabilities" information or data (such as, by way of illustration and not limitation, which processes are supported on what types of workpieces, what finishing options are supported on what workpieces, quality ranking, what delivery options are available for given packages and package sizes, expedited production options and production times, etc.), (ii) "pricing" information or data (such as, by way of illustration and not limitation, prices for specified manufacturing processes or combinations thereof, as carried out on different workpieces, etc.), and (iii) "constraints" information or data (such as, by way of illustration and not limitation, part size constraints, maximum number of process operations that may be completed for a given specified volume of product and delivery time, total manufacturing capacity, etc.). Attribute data may be loaded into a database, so that it may be queried for multiple products to be manufactured. A CAD model for a product to be manufactured may be queried to determine "manufacturing requirements," which may include one or both of (i) "CAD data" indicating required aspects of manufacturing a product based on the CAD model (such as, by way of example and not limitation, workpiece material(s) and number and type of steps required to manufacture the designed product, such as cutting, bending, and bonding, etc.), and/or (ii) "user data" indicating optional requirements specified by a user (such as, by way of example and not limitation, quantity, shipping type, required maximum distance from manufacturer to user, selection of available discounts from the manufacturer, and selection of available expedited production options from the manufacturer, etc.). These manufacturing requirements are compared to one or more of the corresponding attributes for each supplier, to find a best match (or "best supplier"). Accordingly, specific data for different products to be manufactured may be compared to corresponding data from each potential supplier, so that products are manufactured by suppliers best positioned to do so, without requiring separate RFP processes for each product to one or more suppliers.

The system may receive an order for an expedited processing option (also referred to herein as an expedited manufacturing reservation) from a user. This order can take any of a number of forms. In some embodiments of the present disclosure, a user may pay a set price of $X per year for an expedited lead time option; the user may then be able to submit orders for up to Y different products per month, of a quantity not to exceed Z per product per month, where suppliers may determine Y and Z as a function of (i) their overall manufacturing capacity, (ii) the number of similar expedited manufacturing options they have previously granted (to attempt to ensure to the extent possible and/or desired that foreseeable expedited orders will not exceed manufacturing capacity, which may involve analysis of individual user, company, or overall ordering history), and/or (iii) the set price $X. Although months, years, and other time periods are discussed herein, those of ordinary skill in the art will recognize, after reading this disclosure in its entirety, that other time periods, or even open-ended time periods, may be used. For example, a user may pay a set price per month, per week, or for life (e.g., the life of a user, a company, a product line, etc.), among others, for expedited lead time; similarly, expedited processing options may include limits on the number of products and/or quantity of such products that can be expedited on a monthly, weekly, annual, or other basis or may not include any limits whatsoever.

A user may provide a 3D computer model for an ordered product and optionally additional user inputs such as quantity required and other production options (such as a particular finish) that may not be specified in the 3D computer model. The expedited production option may be analyzed to determine whether it applies to the product ordered. This analysis may include a comparison of the identity of the user with a database or other data set identifying users that have current production order options and, in some embodiments, the requested quantity may be verified as being under a production limit. However, in some embodiments may additionally or alternatively include a comparison of one or more aspects of the user-submitted 3D computer model, optionally determined via an interrogator like that further described hereinbelow, to one or more other data sets. For example, the user-submitted 3D computer model may be compared to 3D computer models of previously manufactured parts that may be stored in a warehouse or for which a mold may have already been manufactured and, in some embodiments, expedited production may be offered to the user free of cost or at a discounted rate. Further, aspects of the user-submitted 3D computer model may be compared with specifications of one or more expedited production options, which the user may or may not have already purchased, in order to determine eligibility of expediting production of structures defined by the 3D computer model. For example, one or more particular expedited production options may be limited to particular materials, dimensions, and/or tolerances, among others.

With reference now to the various figures, FIG. 1A is an exemplary high-level flowchart of the present CAD method 100A. While more detailed embodiments of CAD method 100A may be described in further detail below, this high-level description is provided for ease of understanding. In step 105, the system may receive a request from a user for identification of at least one supplier who has the most optimal or applicable correlation of attributes to manufacturing requirements for a 3D computer model designed product. In step 110, supplier-correlation method 100A may analyze and/or collect CAD data from the model of the designed product as provided by the CAD system, user data entered by a user, and corresponding attributes data from one or more suppliers, as described above. The analysis of CAD data generates values for respective ones of a first set of parameters indicating manufacturing requirements associated with the product to be manufactured. In step 115, as will be explained in more detail below, supplier-correlation method 100A compares CAD data and user data to the corresponding supplier data to determine the best matches therebetween. Then, in step 120, supplier-correlation method 100A produces an indication of a "best match" (the supplier that best meets the requirements of the model data and a user data for the designed product as a whole) to a user.

Figure 1B:
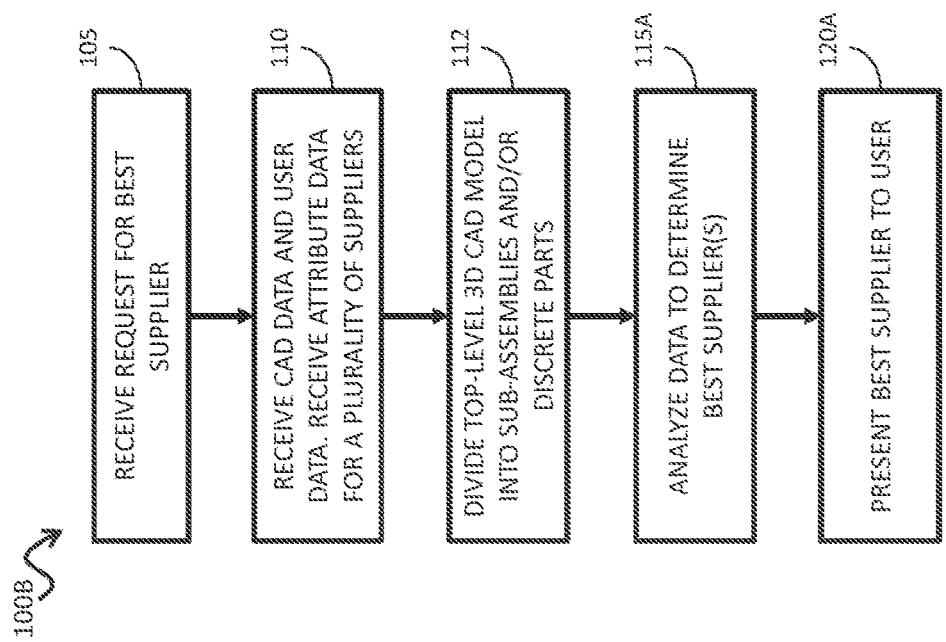
FIG. 1B is a high-level flowchart of another exemplary method of correlating 3D computer models to suitable suppliers.

FIG. 1B illustrates an alternative supplier-correlation method 100B. In FIG. 1B, elements that are the same as those described above with reference to FIG. 1A are indicated with the same reference numerals, and elements similar to those described above with reference to FIG. 1A are indicated with the same reference numerals including an "A" suffix. Note that in FIG. 1B an additional step 112 is set forth in which, as part of the processing of the CAD data, supplier-correlation method 100B may parse a 3D computer model to identify discrete parts or sub-assemblies of related parts of the product to be manufactured. In this manner, rather than simply identifying analyzing supplier data and identifying a single "best supplier" for such 3D computer model as a whole, per steps 115 and 120 of FIG. 1A, in steps 115A and 120A in FIG. 1B multiple "best suppliers" may be separately identified for discrete parts or subassemblies of a product to be manufactured.

Figure 2A:
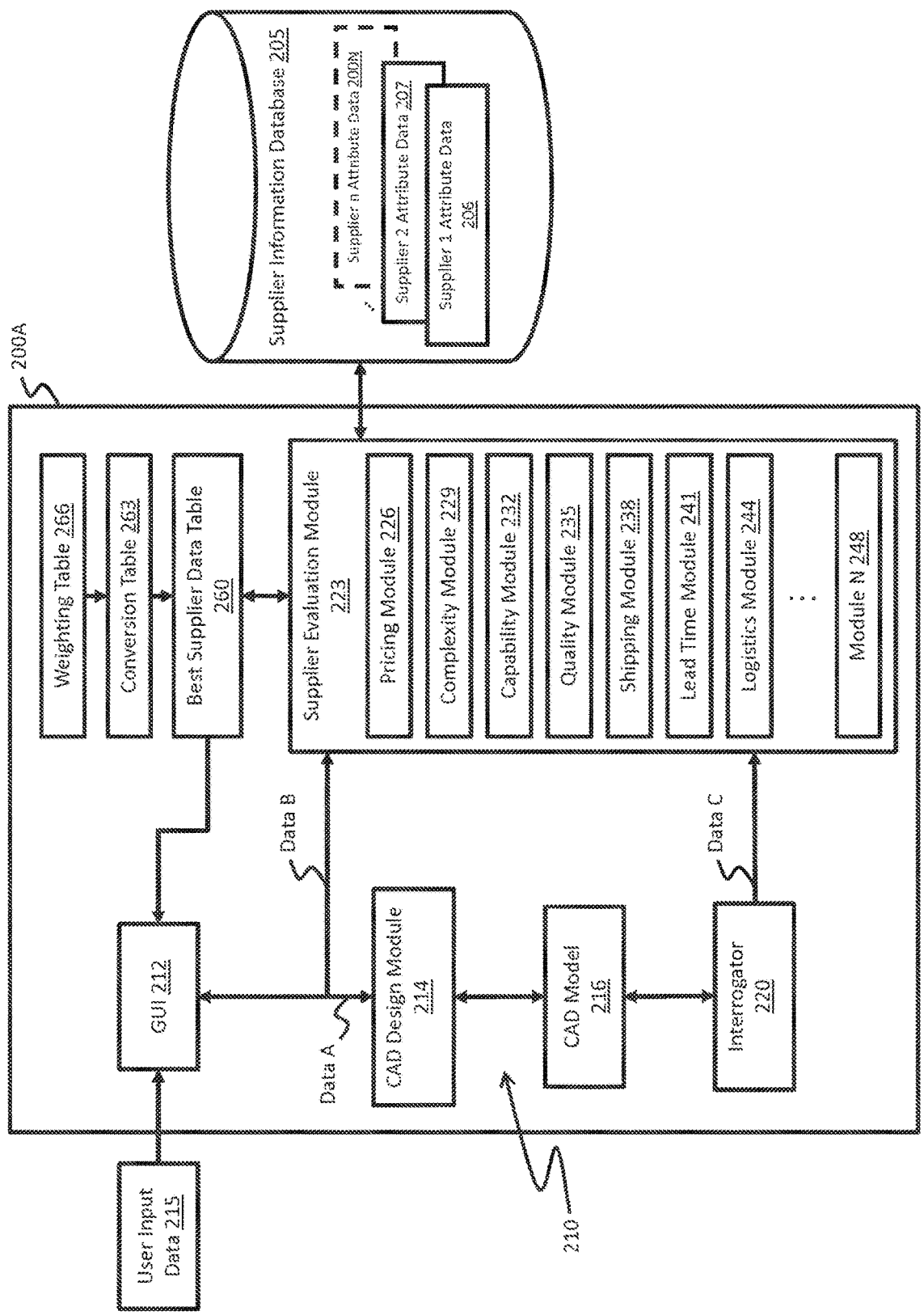
FIG. 2A is a block diagram of exemplary code modules suitable for carrying out the method of FIG. 1A.

FIG. 2A illustrates exemplary software code modules 200A suitable for carrying out the supplier-correlation method 100A of FIG. 1A. In the description to follow, reference is made to "blocks" of computer program code, "modules" of code, or "engines." It is to be understood that these references are made for ease of illustration and discussion. As a practical matter, program code instantiating the disclosure may be organized in any one of a number of well-known manners to provide the functions described. While it is possible that separate code modules may be created to achieve separate functions as described as separate modules, that is not required. So while various code blocks, modules, or engines are described separately, in practice code instantiating such described functions may be intermingled or otherwise organized in whatever fashion is suitable. Individual blocks, modules, or engines of code do not have to be separate or independent sequences of code.

As illustrated in FIG. 2A, a supplier information database 205 is populated with attribute data for each supplier (Supplier 1 Data 206, Supplier 2 Data 207 . . . Supplier N Data 200N). This stored attribute data supports the comparison processes described above with reference to FIGS. 1A and 1B. The database program itself may be any relational database product, such as MySQL, the DB2 products from IBM, or the Oracle Database 12 product, that may provide the organization of information set forth below. In particular, a cloud-based database solution, such as IBM DB2 or Oracle 12c, may be used. By way of example and not limitation, pricing data may include information from which supplier prices may be calculated by the pricing modules discussed below (such as one or more of set-up prices, run-time prices, and other supplier pricing data) for corresponding supplier capabilities. Pricing data may also include overall prices associated with specific products, specific processes, or specified product components. Database 205 may be hierarchical, such that pricing data is listed primarily by process type (and set forth for different workpieces), or primarily by workpiece type (and set forth for different processes).

Aspects of the present disclosure can be used to respond to pricing requests. Notably, in some embodiments, a request for manufacture is considered a pricing (or cost) request independent of an order the product. The user's request for manufacture may be only to obtain information such as pricing, lead-time, and/or quantity availability for purposes other than ordering such as budgeting or project feasibility and the user may not have any intention of ordering the structure. Once a pricing request is verified as subject to an expedite option, a price for manufacture including applying the expedite option may be provided to the user prior to actual manufacture. Aspects of the present disclosure can be used to generate pricing and associated lead times, applying the expedite option. One or more systems of the present disclosure may determine whether another order has been received for a manufactured product. If it has not, the process may end; however, if it has, the process may repeat starting, with the exception that the verification may not include verifying that the user has an active expedited production option, as that may have been verified previously, although other verifications may still be performed, as discussed above.

Attribute data may be provided by the supplier (a "push" model for data entry), using the cloud-based relational database table for entry that is provided for that purpose by the database products set forth above. Other alternatives include a "pull" model for data entry, by which the party designing the product, or a third party service provider that provides the disclosure as a service to the designer, may obtain the information by manual or other means from the supplier. Accordingly, database 205 is pre-populated with attribute data, prior to execution of the present supplier-correlation method. In an alternative embodiment of the invention some, most, or all of the attribute data may be pushed or pulled in real-time from some, most, or all of Suppliers 1-n. Finally, while supplier information database 205 is depicted as being separate from Modeling software program 200A, it may be made available as an integrated portion of modeling software program 200A.

With continuing reference to FIG. 2A, a conventional modeling software program 210 may include a portion of graphical user interface (GUI) 212 and a CAD design module 214 that produces a 3D computer model 216. Through GUI 212, a user may provide a set of data inputs 215 that include Data A and Data B. Data A is conventional design requirement and related data, such as shapes and tolerances, that is typically used by a conventional CAD design module 214 to generate (or "render") a 3D computer model 216 of a designed product to be manufactured. The portion of GUI 212 that receives user inputs 215 corresponding to Data A, as well as CAD design module 214 and resultant 3D computer model 216, may be embodied in known modeling software programs, such as the modeling programs mentioned above. Data A primarily establishes the technical attributes of 3D computer model 216. On the other hand, Data B generally corresponds to user data (as described above) for products to be manufactured based on 3D computer model 216, including (by way of illustration and not limitation) quantity of products to be manufactured, requested delivery options (carrier, shipping type, regular turnaround time versus expedited, discount eligibility, etc.), requested maximum physical distance between the supplier and a user, requested quality level of manufactured products, and requested surface finishing options. As may be apparent to a person of reasonable skill in the art, the portion of GUI 212 that receives user inputs 215 corresponding to Data B are not embodied in conventional modeling software programs 210.

As an aid to further understanding of the exemplary supplier-correlation method and system, FIG. 3A depicts a simplified 3D computer model 216 for a rectangular drawer 300. Drawer 300 includes left side 301, right side 304, rear side 307, a top 310, and a bottom 313, all made of a single sheet metal workpiece. Drawer 300 also includes a front side 316 made of plastic. Metal hinges 319, 322 are affixed by conventional screw and nut assemblies (not shown) onto an upper surface of top 310 and a front surface of front side 316, thereby enabling front side 316 to move to an open, hinged position relative to remaining portions of drawer 300. Front side 316 also includes a metal pull 325, affixed by a conventional screw and nut assembly (not shown) onto the front surface of front side 316.

With reference to FIG. 2A, 3D computer model 216 is analyzed by an interrogator 220 to derive process and physical requirements of a product to be manufactured in accordance with such 3D computer model. These requirements are provided as an output Data C ("CAD data," as described above) to supplier evaluation module 223. As described in more detail below, data parsed by interrogator 220 may include identifying compositions of starting workpieces in question. In the case of a 3D computer model for drawer 300, interrogator 220 may identify sheet metal as a starting material for bottom, side, and top surfaces thereof. Interrogator 220 may identify front side 316 as a procured part (in the sense that front side 316 may be pre-processed, rather than formed as part of a manufacturing process for drawer 300). Similarly, interrogator 220 may identify pre-processed metal hinges 319, 322, metal pull 325, and screws and nuts for interconnection, as procured parts. Interrogator 220 may also identify thicknesses and other dimensional attributes of identified workpieces.

More specifically, interrogator 220 parses 3D computer model 216 to identify separate elements thereof by reading a combination of (a) specific commands issued by a CAD system, and (b) specific routines or functions associated with such commands, to determine if they collectively define an individual element or portion (referred to as a "shape," "Solid Body," or "component") of 3D computer model 216. Many CAD systems, including, by way of example and not limitation SolidWorks, include an application program interface (API) to enable a user to control the issuance of customized routines or functions associated with such commands. Interrogator 220 reads such commands, routines, and functions to determine if they define an individual shape, and if so, analyzes various geometric aspects of such defined shape to determine if such aspects correspond to one or more manufacturing requirements for a product to be manufactured based on 3D computer model 216. If so, such requirements are output from interrogator 220 as CAD data Data C, for processing and analysis by one, some, or all of modules 226-248 of supplier evaluation module 223, as described above. In the description to follow, reference may be made to the following terms:

| | |
|---|---|
| "Point" | X Y Z point in space |
| "Edge" | contains two Points |
| "Face" | a plane, bounded and defined by Edges |
| "Vertex" | where two or more Edges meet |
| "Solid Body" or "shape" | a volume defined by stitching interconnecting Faces together |
| "Model" | includes all of the above items. May contain multiple Solid Bodies (assembly) |

As a first step, interrogator 220 identifies discrete shapes in 3D computer model 216. In an embodiment based on the SolidWorks modeling software program, interrogator 220 reads the "FeatureManager Design Tree" (an outline representation of individual shapes) to determine the number of Solid Bodies (or shapes) in the design. Representations of individual shapes may be found in other CAD software files, and other CAD software systems may be used. In SolidWorks, the command to analyze the number of Solid Bodies is object[ ]bodies=(object[ ])part.GetBodies2((int)
Const.swBodyType_e.swSolidBody,false);

and the output is a list of bodies. The foregoing code statement is listed by way of example only, other code statements or sequences may be used.

In order to determine whether or not a given shape has a uniform thickness, interrogator 220 may first read the "GetBoundingBox" SolidWorks API command. The resulting output is an array of triples of X, Y and Z extents expressed as follows:

[$X$Corner1, $Y$Corner1, $Z$Corner1]

[$X$Corner2, $Y$Corner2, $Z$Corner2]

Interrogator 220 may determine which dimension represents thickness by determining distance between corners. Thickness is represented by the shortest distance, as follows:

abs[$X$Corner1−$X$Corner2]=Variable $X$ abs[$Y$Corner1−$Y$Corner2]=Variable $Y$ abs[$Z$Corner1−$Z$Corner2]=Variable $Z$ For this example, assume Variable X has the lowest value from the three results and therefore represents the dimension of 3D computer model 216 indicating thickness. If that is the case, width, and length of 3D computer model 216 may then be calculated as: Width=abs[YCorner1−YCorner2]

Length=abs[ZCorner1−ZCorner2]

Given these calculations, interrogator 220 determines that a workpiece has a uniform thickness if all of the following statements are true (see enclosed example code):

3D computer model 216 may have at least one Solid Body

All Vertexes of the Solid Body Faces that are perpendicular to the base plane are also equal to the thickness value (Variable X)

No Vertex Edge length is less than the thickness value

The perimeter from the top face is equal to the perimeter of the bottom face. This is determined through the following code which finds the perimeter for each Face. The values of the Faces are then compared and if exactly equal, the output is true.

```
double getPerimeter(IFace2 face)
{
    var edges = face.GetEdges( ) as object[ ];
    double perimeter= O;
    foreach (!Edge in edges) if
    (edge != null)
    perimeter+= edge.GetLength(SwApp);
    return perimeter;
}
```

The foregoing code statements are listed by way of example only; other code statements or sequences may be used. If the results are all true, the analyzed shape of 3D computer model 216 represents a workpiece of uniform thickness. As such, interrogator 220 concludes that the analyzed shape may be fabricated from a single sheet metal part, or any other starting material that requires a uniform thickness. In an embodiment, as part of Data B a user may select which starting materials are preferred, and interrogator 220 compares geometric attributes of 3D computer model 216 with those attributes required by given starting materials. In this example, if a user selects "sheet metal," interrogator 220 confirms 3D computer model 216 has a uniform thickness, and hence can be manufactured from sheet metal. Accordingly, by way of example and not limitation, "sheet metal" is included in CAD data (Data C) as a manufacturing requirement. As may be described in more detail below, this data may cause pricing module 226 to read prices for sheet metal parts (versus prices for plastics or other materials) from supplier database 205. As a result, pricing module 226 determines a given supplier's calculated price per unit for a product to be manufactured in accordance with such manufacturing constraints as determined by interrogator 220.

As described in more detail in U.S. patent application Ser. No. 14/060,033, filed on Oct. 22, 2013, and titled "AUTOMATED FABRICATION PRICE QUOTING AND FABRICATION ORDERING FOR COMPUTER-MODELED STRUCTURES" ("the '033 application"), which is incorporated by reference herein for its teachings of extracting pricing data from computer models, and in U.S. patent application Ser. No. 14/282,773, filed on May 20, 2014, and titled "METHODS AND SOFTWARE FOR ENABLING CUSTOM PRICING IN AN ELECTRONIC COMMERCE SYSTEM" ("the '773 application"), which is incorporated by reference herein for its teachings of particular interrogator engines, interrogator 220 may also identify required process operations for such workpieces. While reference is made to the aforementioned patent applications, the teachings of this description are not limited thereby. In the case of a 3D computer model for drawer 300, with reference to FIG. 3B interrogator 220 may determine that sides 301, 304, top 310, and bottom 313 (which interrogator 220 may determine are manufactured from a single starting sheet metal workpiece 340) may be formed by first performing cutting operations indicated by dashed lines 344, and then performing bending operations indicated by dotted lines 348. Interrogator 220 may determine length of cuts 344 and degree of bends 348, as well as other process attributes such as time required to drill holes into top 310 and front side 316 for hinges 319, 322, which may depend on the composition and thickness of sheet metal workpiece 340 and plastic front side 316. As described above, interrogator 220 may also determine weight and other attributes of a product manufactured in accordance with 3D computer model 316, as a function of identified starting material, measured thickness, geometric shape, and volume.

As a result, interrogator 220 provides the data described above as Data C (CAD data) to supplier evaluation module 223. Supplier evaluation module 223 includes one or more of a number of modules that may compare different aspects and combinations of CAD data (from Data C) and user data (from Data B) to corresponding attribute data from supplier information database 205. These modules are explained in more detail below.

Supplier evaluation module 223 includes pricing module 226. Pricing module 226 receives CAD data and user data to determine applicable manufacturing requirements for products to be manufactured in accordance with 3D computer model 216. Pricing module 226 then compares those requirements to applicable supplier data. As described in more detail in the aforementioned U.S. patent application Ser. No. 14/282,773, filed on May 20, 2014, and titled "METHODS AND SOFTWARE FOR ENABLING CUSTOM PRICING IN AN ELECTRONIC COMMERCE SYSTEM," which is incorporated by reference herein for its teachings of particular pricing engines, pricing module 226 may receive data from supplier information database 205 that stores cost (or price) information, expressed on a unit basis, for given processes conducted on given starting materials. For example, Table I, below, provides a number of exemplary variables that may be stored in best supplier data table 260. Note that the first three entries (L, W, T) correspond to geometric measurements from interrogator 220, as described above. The remaining entries are calculated based on these outputs from interrogator 220, as well as data from Data B (such as requested quantity):

TABLE I

| Variable | Definition |
| --- | --- |
| L | Length of initial sheet metal part |
| w | Width of initial sheet metal part |
| T | Thickness of initial sheet metal part |
| NoSheets | Number of stock sheet metal sheets needed to manufacture one unit |
| VolSheet | Volume of a stock sheet metal sheet |
| MatSS | Cost of stainless steel per cubic inch |
| MatAL | Cost of aluminum per cubic inch |
| CutL | Length of all cuts (in inches) in a unit |
| CutLN | Length of a specific cut (in inches) in a unit |
| LCutperH | Number of inches a laser cutter may cut in 1 hour |
| LCut$perHr | Cost to operate the laser cutter per hour |
| LCutSetUp | Time to set up the laser cutter for a job |

Table II, below, provides two example pricing engines 226 that utilize the variables of Table I to provide the following price calculations:

TABLE II

| Standard Out12ut | Material Cost per unit--SS | Material Cost 12er unit--AL | Run Cost 12er unit-Laser Cutting | Set u12 Cost-Laser Cutting |
| --- | --- | --- | --- | --- |
| Pricing Engine 1 | L × W × T × MatSS | L × W × T × MatAL | CutL/LCutperH × LCut$perHr | LCutSetUp × LCut$perHr |
| Pricing Engine 2 | NoSheets × VolSheet × MatSS | No Sheets × VolSheet × MatAL | (((CutLl I LCutperH) + .1) × LCut$perHr) + (((CutL2 I LCutperH) + .1) × LCut$perHr) | (LCutSetUp + .15) × LCut$perHr |

Table III, below, provides an example of a composite pricing module 226 that utilizes a portion of each of the "Pricing Engine 1" and "Pricing Engine 2" shown in Table II. In particular, this composite pricing engine uses "material cost per unit" calculations for stainless steel (SS) and aluminum (AL) and a "set up cost" calculation for laser cutting drawn from "Pricing Engine 1," while simultaneously utilizing a "run cost per unit" calculation for laser cutting from "Pricing Engine 2."

TABLE III

| Standard Outout .J.. | Sourcirn.>. ID | Calculation |
| --- | --- | --- |
| Material Cost per unit--SS | Pricing Engine 1 | L × W × T × MatSS |
| Material Cost per unit--AL | Pricing Engine 1 | L × W × T × MatAL |
| Run Cost per unit-Laser Cutting | Pricing Engine 2 | (((CutLl/LCutperH) + .1) × LCut$perHr) + (((CutL2 I LCutperH) + .1) × LCut$perHr) |
| Set up Cost-Laser Cutting | Pricing Engine 1 | LCutSetUp × LCut$perHr |

As would be apparent to one reasonably skilled in the art, the invention may be applied to other manufacturing types, including but not limited to the manufacture of apparel. Both sheet metal and apparel designers use CAD systems to design their products, using sheets of flat material for manufacture. Design data, such as material choice, precise dimensions, or locations of additional features may be embedded within the digital design. Designers may choose different metals or fabrics (including non-woven materials such as leather) depending on the strength and other inherent properties of the material, which affects what manufacturing methods may be necessary to work the material. Purchased components (in some cases, identical purchased components) may be added to the design. Modeling software programs may be used to visualize the shape of the finished product. In both sheet metal and apparel manufacturing, the sheet (metal or fabric) may be cut or stamped by a variety of methods using computerized machines. Units may be moved from station to station during manufacture. Whereas sheet metal is typically connected by rivets or welding, sheet fabric is typically connected by stitching or gluing. Surface finishes may be applied to both; both may be painted, silk-screened, or otherwise covered with a protective substance.

The "uniform thickness" determination set forth above, as well as the attendant height, length, and thickness measurements, may be used to enable other comparisons between manufacturing requirements and supplier attributes. For example, once the use of a sheet metal workpiece has been confirmed as set forth above, a capabilities engine may query stored supplier data for any one of length, width, thickness, or any other supplier constraints for sheet metal parts. An example of a potential supplier constraint that would be determined by the nature of the starting workpiece material is as follows. For mechanical hole punching for sheet metal parts, a press brake may form predetermined bends in a workpiece by clamping it between a matching punch and a die. A press brake may include a bed for supporting the workpiece between the punch and the die.

However, press brakes cannot typically bend parts longer than the length of the bed. If a given supplier uses a press brake having a maximum bed length of eight feet, utilizing the process as set forth above, an interrogator may determine that a defined shape of a 3D computer model has a length of ten feet. In this case, a pricing module may not calculate pricing for that supplier because that supplier is unable to meet one of the manufacturing requirements imposed by the 3D computer model. In some embodiments, an expedition module may utilize outputs from interrogator to determine whether one or more components of an order can be expedited, as described herein. For example, in some embodiments, operation calculation module 328 may automatedly compare one or more requests for manufacture and one or more aspects of a 3D computer model (optionally received or derived from interrogator output) with an expedited manufacturing reservation and determine, as a function of the automated comparing, whether the expedited manufacturing reservation is applicable to the request for manufacture. Information may then be displayed to a user indicating the total time to complete the request for manufacture.

The expedition module may include a supplier parameter module and a pricing module. The supplier parameter module may comprise a database (with associated control code, where necessary) that may store, for example, three or more types of information: standard production data, expedited production data 324, and expedited production purchase data. The supplier parameter module may be any relational database product that can provide the organization of information set forth below. The standard production data sets forth the lead time and associated price for the various manufacturing operations supported by a given supplier. In essence, this may be the information illustrated broken down into lead time by individual process and associated price. The expedited product data may set forth processes that can be expedited by lead time (which may be less than the lead time for the same process stored in standard product data) and associated (e.g., higher) price. In essence, this may be the information again in more granular form. Note that this information may be listed separately for each supplier (Supplier 1, Supplier 2, . . . , Supplier N), because different suppliers may have different processes they support, and different lead times and prices associated with those processes. In an embodiment, this information may be provided by each supplier as part of the initial or continuing configuration of the system; however, the present disclosure is not limited to that—the information could be provided on demand, during operation of a system of the present disclosure, or in any other suitable fashion. Furthermore, this information for each supplier could vary by product type, so one set of data may be used for sheet metal parts and a separate set of data may be used for plastic parts, among others. Note also that while standard production data and expedited production data are shown separately, in practice they could be stored in the same data structure or table. Furthermore, in practice, supplier production data may also include other information for each supplier, such as name and location and other data from which supplier prices may be calculated by the pricing modules if the prices are not directly stated (such as one or more labor costs, set-up costs, shipping costs, and/or other supplier pricing data).

The supplier parameter module 320A may also include expedited production purchase data 326. This may be a listing, by customer, of the expedited purchasing options that are active. This data includes a specification of whether they have an active option, along with characterizing what type of option may be active (see the discussion above for different types of options contemplated). In some embodiments, this data could include an identification, by particular manufacturing processes, of whether/what type and/or timing option is active.

The pricing module may include an operation calculation module 328, which may receive the output of the interrogator to determine which manufacturing processes are required to manufacture the object described in a given 3D computer model and the output from supplier parameter module to determine (i) whether and what types of expedited production options may be available as a function of expedited production purchase data and (ii) based on that determination, whether standard processes and associated prices (from standard production data) or expedited processes and associated prices (from expedited production data) are applicable. The pricing module may then determine the overall lead time and associated prices for the product to be manufactured. Continuing the example discussed above for interrogator, the operation calculation module may pull associated prices from the supplier parameter module. In this example, operation calculation module may determine that drilling is listed as an expedited process in expedited production data for a given supplier, for which an expedited lead time E is available, at a price of $Y for drilling per inch into aluminum. The pricing module may then determine a price for those operations, as $X(Y×2.5×N), where X is the number of units, Y is the price for expedited drilling per inch, 2.5 is the thickness of the workpieces in inches, and N is the number of holes to be drilled).

By way of further example and not limitation, with reference to FIGS. 3A and 3B, Data C may include data identifying a workpiece on which manufacturing processes are to be conducted (metal sheet 340), its thickness (for example, 0.25 inches), and a number H of holes to be drilled into the workpiece (in this case, four holes, two each for hinges 319, 322). Data on supplier information database 205 may include price data such as $X for drill set up time and $Y for drilling per tenth of an inch into sheet metal. Pricing module 226 may determine a price for such operations as (X+(Y×2.5×H)) per unit for this particular aspect of manufacturing the requested product. Similar calculations may be made for other processes required to manufacture the requested product, such as (in the case of 3D computer model 216 for drawer 300 of FIGS. 3A and 3B) cuts 344, bends 348, drilling holes into front side 316 for hinges 319, 322 and pull 325, and screwing/threading operations required to attach hinges 319 and pull 325. If Data B includes a requested volume of products to be manufactured, pricing module 226 may then multiply the foregoing calculation by a total number of units requested, to arrive at a total price for a requested manufacturing job, per supplier. Note that if information from supplier information database 205 does not indicate that a given manufacturer may support all processes required by Data Band Data C (as determined by capability module 232, as described below), or if a given supplier does support all required processes but has not included a price for one or more of them (as determined by pricing module 226), pricing module 226 may discontinue calculations for that supplier.

3D computer models typically contain a plethora of data but do not store the data in such a way that pricing information may be derived directly therefrom. To cure this deficiency, after pulling data from 3D computer model 216, interrogator 220 may reformat the data and provide the reformatted data to the pricing module 226 (as well as to one, some, or all of other modules 229-248 of supplier evaluation module 223, as required). In an alternative embodiment, interrogator 220 interprets the data into new data specific for the pricing module 226 (as well as for one, some, or all of other modules 229-248 of supplier evaluation module 223, as required). Accordingly, pricing module 226 may use specific data in specific formats in formulas to calculate pricing.

Interpreting data into new data may involve one or more of any number of functions and/or operations. For example, for a sheet metal part, a 3D computer model may include a variety of information regarding a bend or set of bends (such as bends 348 as shown in FIG. 3B). However, it is useful for a pricing module to have access to information specifying how many unique bends there are, with different bend lengths and the quantity of bends for each unique bend length. To determine such information, interrogator 220 may query each bend in the 3D computer model, establish a table of bend lengths, and determine a sum of bend lengths, e.g., for each bend of a common bend length. This may be important for the pricing module 226 (as well as for one, some, or all of other modules 229-248 of supplier evaluation module 223, as required) because each unique bend length involves a certain amount of set-up time and therefore a different price. In the case of ten bends all of the same bend length, there may only be one set-up charge applied. In the case of ten bends each with a unique bend length, there might be ten set-up charges applied, depending upon the algorithms of the pricing module.

Another sheet metal example is "Hole Too Close To An Edge" (HOLE). Modeling software programs and 3D computer models typically do not store this information in the 3D computer model. However, a HOLE may cause manufacturing issues (e.g., it may deform surrounding material, and, in the case of a diameter, the diameter may become oblong) if it is, for example, less than four times the material thickness away from the bend. Therefore interrogator 220 may be programmed to check the distance from any hole to the closest bend, divide it by the material, and create a true/false flag as a function of the result. The true/false flag may then trigger pricing module 226 to calculate the price differently than it might otherwise.

Yet another sheet metal example is that a punched hole diameter typically needs to be the same or greater than the material thickness. If it is not, a second operation may be required to manufacture the hole, resulting in more time spent to create the hole than if it may simply be punched. Interrogator 220 may be programmed to check for this situation and create a true/false flag depending upon the result. Pricing module 226 may then utilize this true/false flag in determining a price, whereas without such a true/false flag the pricing module may underprice holes with a diameter less than the material thickness of the associated material.

A generic example relevant to sheet metal, machining, and injection molding is whether a hole extends completely through a part or only extends partially into the part. The result may affect manufacturing costs, as, for example, a non-through hole in sheet metal requires another operation (e.g., machining) to create a hole. Modeling software programs and 3D computer models may not specify whether or not a hole extends through associated material. In some modeling software programs, given a sheet with a thickness, to put a hole in the sheet, a user may create a cylinder and define one or more Boolean operations to subtract the cylinder from the sheet; under these conditions, there may not be any explicit information in the 3D computer model regarding whether the hole extends through the sheet. In this case, interrogator 220 may be programmed to analyze the maximum material thickness for the hole and compare it to the geometry modeled to cut the hole, creating a resultant true/false flag that may be utilized by pricing module 226 in determining a price.

With further reference to FIG. 2A, supplier evaluation module 223 may include complexity module 229. This module measures the number of process steps (as indicated by interrogator 220) required to manufacture a product based on 3D computer model 216. For example, interrogator 220, complexity module 229, or some other independent program may take individual process steps identified by interrogator 220 to generate a manufacturing "routing" list that sets forth the sequence of processes to be conducted on the workpiece or workpieces. In this case, complexity module 229 may query a generated routing list to generate a total number of process steps required to manufacture the product in question. Complexity module 229 also queries user data from Data B indicating requested delivery time. Complexity module 229 then compares this combination of data (number of process steps required per Data C, and requested delivery time per Data B) to corresponding constraints data from the respective suppliers indicating the number of steps they are capable of providing for a given delivery schedule and may note a mismatch between number of steps/delivery a supplier may provide, and number of steps/delivery requested by a user.

With further reference to FIG. 2A, supplier evaluation module 223 may further include a capability module 232, which ensures that a given supplier has the capability to meet particular requirements of the designed product. The "uniform thickness" determination made by interrogator 220 as set forth above, as well as the attendant height, length, and thickness measurements determined by interrogator 220, may be used by capabilities module 232 (as well as one, some, or all of modules 226,229, and 235-248 of supplier evaluation module 223) to enable other comparisons between manufacturing requirements and supplier attributes. For example, once the use of a sheet metal workpiece has been confirmed as set forth above, capabilities module 232 may query stored supplier data for any one of length, width, thickness, or any other supplier constraints for sheet metal parts. An example of a potential supplier constraint that would be determined by the nature of the starting workpiece material is as follows. For mechanical hole punching for sheet metal parts, a "press brake" forms predetermined bends in a workpiece by clamping it between a matching punch and a die. A press brake includes a bed for supporting the workpiece between the punch and the die. Press brakes may not bend parts longer than the length of the bed. If a given supplier uses a press brake having a maximum bed length of eight feet, and utilizing the process as set forth above interrogator 220 determines that a defined shape of 3D computer model 216 has a length of ten feet, capabilities module 232 may determine a mismatch exists, and as a result pricing module 226 would not calculate pricing for that supplier because that supplier is unable to meet one of the manufacturing requirements imposed by 3D computer model 216. In an alternative embodiment, if interrogator 220 determines that 3D computer model 216 requires a 90-degree bend(s) 348 in a quarter-inch thick sheet metal 340, then capability module 232 may compare that manufacturing requirement to corresponding data from suppler information database 205 for each supplier, to indicate whether a given supplier may manufacture 90-degree bends in quarter-inch thick sheet metal.

With further reference to FIG. 2A, supplier evaluation module 223 may also include a quality module 235. Quality module 235 receives user data from Data B indicating required quality for a product to be manufactured. This may be indicated by an entry of required quality on a scale of 1-5, 5 being the highest quality. So for example, for drawer 300 of FIG. 3A, it may be that a supplier of more modest quality may be sufficient, which may lead to lower prices. This data may be compared against data from suppliers in the suppler information database 205, with that comparison being factored into a best supplier calculation (as described in more detail below). In this particular instance, while quality ranking information may be provided by suppliers themselves, data may originate from external sources. Supplier data may originate from an external ranking system (see for example 1-6 star ratings for aluminum sheet metal manufacturers from Trade Media Holdings Ltd.), from rankings provided by a supplier itself, or from some combination thereof. Quality module 235 may filter suppliers in accordance with a user input and suppliers' quality rankings.

Supplier evaluation module 223 may also include a shipping module 238. Shipping module 238 may receive CAD data inputs from Data C indicating dimensions and weight of a product to be manufactured. Shipping module 238 may also receive CAD data input indicating what separate shapes have been identified by interrogator 220. Shipping module 238 may utilize this data to define optimal dimensions and other characteristics (such as rigidity, weight, and the like) for a shipping package for such product as a single whole or as separable parts. Shipping module 238 may also receive user data from Data B applicable to shipping, such as (by way of example and not limitation) requested shipping type (air, ground, etc.), requested maximum distance from supplier to user, and information indicating a user is eligible for one or more shipment discounts from one or more carriers. Shipping module 238 may compare information regarding optimal shipping package derived from Data C, and specified shipment parameters received from Data B, to corresponding information in supplier information database 205. In some embodiments, Data B may include a user-specified shipment package.

Supplier evaluation module 223 may further include a lead time module 241. Illustrative embodiments for lead time module 241 are generally described in U.S. patent application Ser. No. 14/929,102, filed on Oct. 30, 2015, and titled "Methods, Systems, and Software for Processing Expedited Production or Supply of Designed Products", the teachings of which are incorporated herein by reference. While reference is made to the aforementioned patent application, the teachings of this description are not limited thereby. Lead time module 241 may receive CAD data from Data C indicating the number and type of required production operations, and derive therefrom raw process times to calculate expected lead time between order placement and when production is complete, and the products are ready for shipment. Lead time module 241 may also receive user data from Data B indicating requested product quantities, and eligibility for expedited production turnaround times. Suppliers may separately charge an uplift fee for expedited production, or a user may be a member of a program by which it pays a standing fee to be eligible for expedited production. Some identified processes may not be eligible for expedited production, and others may be. Lead time module 241 reads data from a database (not shown) that lists setup time per operation, and run time per operation/unit, for all processes that cannot be expedited (and therefore, lead time therefor is calculated as standard lead times) and all processes that can (and therefore, lead time therefor is calculated as expedited lead times, the actual value of which depend on expedited options chosen by a user). "Set up time" refers to the amount of time between the workpieces arriving at a given manufacturing production tool, and the commencement of operations on the first of the workpieces. This is primarily a measurement of the amount of time it takes to set up the tool for production for a given run of workpieces. The "run time per operation" is the amount of time it takes to run the process on a given workpiece. Note that set up time occurs once, at the start of a production run, while run time per operation is expressed on a per unit basis, because it repeats for all the workpieces in the production run. These lead times are then calculated for the quantity of product requested by the user as part of user data.

In operation, lead time module 241 adds up all the applicable set up times and all the applicable run times (which is run time per operation, multiplied by the number of units to be manufactured), and then adds additional time due to a specific quantity requested by a user, to determine the total lead time, rounded up to the next whole day. Lead time module 241 compares expected lead time, quantities, and expedited production eligibility to corresponding constraints data from supplier information database 205 to determine whether these requirements may be met. In an alternative embodiment, lead time module 238 may derive a supplier's lead time for required manufacturing operations.

Supplier evaluation module 223 of FIG. 2A may also include a logistics module 244. Logistics module 244 may receive CAD data from Data C indicating the number and type of required production operations, and user data from Data B indicating requested product quantities. Logistics module 244 may derive therefrom logistics involved in manufacturing the product, most notably whether the product may require assembly by one or more contractors working on behalf of a supplier, such contractors adding specific processes or structures to the product as it is being built. If so, logistics module 244 optimizes timing and associated costs of shipment of the product between suppliers and their contractors during the composite build process. This calculated logistics optimization is then compared to shipment information from respective suppliers from supplier information database 205 as well as information regarding their contractors. In addition to the modules described, other modules of supplier evaluation module 223, such as Module N 248, may provide calculations based on other variables.

As described above, and as will be described in more detail below with reference to FIG. 6, supplier evaluation module 223 carries out one or more of the foregoing calculations and comparisons and populates best supplier data table 260 with the results. Table 260 includes the above-described input data from Data B and Data C, the comparable data from supplier information database 205, and resultant evaluations, per supplier. Data table 260 also receives inputs from conversion table 263 and weighting table 266. As will be explained in more detail below with reference to FIG. 7, conversion table 263 and weighting table 266 support a weighted analysis of particular variables in the design attributes and corresponding supplier data. Conversion table 263 converts variables having different absolute values into interrelated, relative values. Weighting table 266 assigns relative weight, or value, to those related values. In this manner a user may assign relative importance to particular attributes. Supplier evaluation module 223 then compares resultant values stored on table 260 and causes table 260 to send information corresponding to a best supplier as determined by supplier evaluation module 223 to a user via GUI 212.

As may be apparent to a person reasonably skilled in the art, it is not required that all of the modules depicted in supplier evaluation module 223 be included; one or more may be sufficient. The supplier evaluation module 223 may typically include pricing module 226 and capability module 232. However, it is to be understood that none of such modules are required or essential to be utilized as a part of the calculation module 223, Moreover, as may be apparent to those of ordinary skill in the art, the modules within calculation module 223 are of two general types. Some (like the capability module 232 and the quality module 236) compare a number or value from Data B or Data C to a corresponding number or value for each supplier from the supplier information database 205. So by way of example and not limitation, if Data C indicates that a workpiece is a quarter inch thick sheet of stainless steel, then capability module 232 compares that against data from supplier database 205 indicating whether a given supplier has the capability of processing a workpiece of that thickness and composition. Other modules (such as pricing module 226, complexity module 229, lead time module 241, and logistics module 244) may be more complex, in that for some of the embodiments described above data is extracted from the 3D computer model 216 in order to determine requirements and carry out the described calculations for comparisons to supplier information. In alternative embodiments of the disclosed supplier-correlation methods and systems, in the event of a mismatch between constraint information (or any other information) provided by a supplier and manufacturing requirements of a product to be built in accordance with a given 3D computer model, a notification may be sent to such supplier that provides the comparison, along with other applicable information requested by the supplier. So for example, with reference to the discussion above, if a press bed of Supplier 1 is too short to meet manufacturing requirements for a given 3D computer model under analysis, Supplier 1 may be notified of such comparison. Supplier 1 may request to receive more information from a user, or it may elect to only take action if it experiences repeated notifications of ineligibility due to the same issue. In alternative embodiments, a supplier may set one or more other criteria (such as "requested quantity") as a screening filter, so that it does not receive such notices unless requested quantity is above a certain threshold (such as 500 units).

Figure 2B:
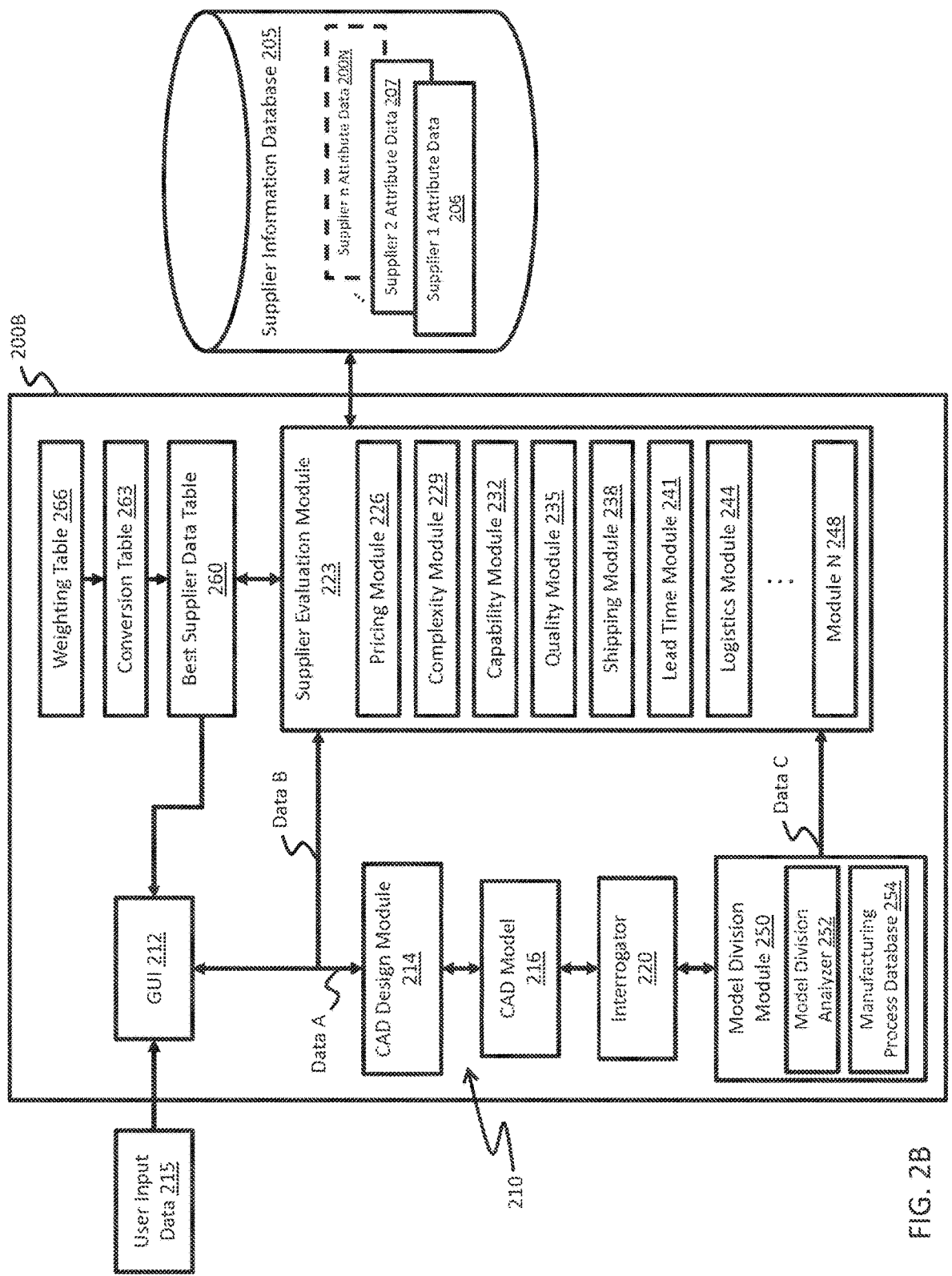
FIG. 2B is a block diagram of exemplary code modules suitable for carrying out the method 100B of FIG. 1B.

FIG. 2B illustrates exemplary software code modules 200B suitable for carrying out the supplier-correlation method 100B of FIG. 1B. In the description to follow, elements that are similar to those described above with reference to FIG. 2A are indicated with the same reference numerals. In FIG. 2B, an output of interrogator 220 is provided to a model division module 250. The purpose of model division module 250 is to first parse the data from the 3D computer model 216 into its component parts, and then create subassemblies of those parts so that "best suppliers" may be selected for those parts and subassemblies separately, as opposed to selecting a single supplier for all of such parts and subassemblies. After interrogator 220 determines a number of shapes in a given 3D computer model (utilizing a process such as that set forth above), model division analyzer 252 may create a first set of groupings of shapes. In this first grouping step, each detected shape is assigned to its own distinct group. If there is only one Solid Body in 3D computer model 216, all associated manufacturing processes are associated with that single Solid Body, because all such processes must pertain to that single shape. If more than one Solid Body is detected, then the 3D computer model 216 is determined to represent an assembly of multiple shapes (or components), and interrogator 220 analyzes such assembly to identify individual Solid Bodies. This analysis is performed by analyzing respective X, Y, and Z extents to find the smallest combination that interconnect, and thus define a distinct Solid Body.

As set forth above, each detected Solid Body is analyzed by interrogator 220 to discern one or more geometric properties, and from those properties interrogator 220 associates one or more manufacturing requirements to each Solid Body. In a second grouping step, model division analyzer 252 may then group together shapes that share common manufacturing requirements. So for the specific example set forth above, all shapes having uniform thicknesses would be grouped together because they all may be manufactured from sheet metal. Note that if a starting material is not identified by the process set forth above, and interrogator 220 cannot otherwise identify manufacturing requirements for such shape from its height, length, thickness, and other geometric properties, interrogator 220 may categorize such shape as a procured part. Model division analyzer 252 assigns all procured parts to a separate grouping. By way of example, with reference to the example depicted in FIG. 3A, plastic front side 316 would be separately identified by interrogator 220 as a procured part. Interrogator 220 may utilize a number of different methods to identify procured parts. In one embodiment, interrogator 220 reads a name (or part number) associated with such shape, and compares it to product information from one or more internet-accessible databases (not shown) of purchased parts, such as those available from sources such as PEMM® Penn Engineering® (registered trademarks of Penn Engineering) and McMaster-Carr, or any other source of products bearing names or part numbers. In alternative embodiments, a given thickness, length, and/or width measurement, or combination thereof, may be classified as a purchased part, by default. For example, if a given shape is less than one inch cubed, it may be automatically classified as a purchased part.

Model division analyzer 252 then analyzes all main groupings of shapes to discern sub-groupings that share common manufacturing processes. By way of example, a "main grouping" may be all shapes to be manufactured from sheet metal, as described above. In an embodiment, model division analyzer 252 may create sub-groupings of shapes that require certain ones of such common hole punching operations. For example, model division analyzer 252 may define a main grouping of all shapes with uniform thickness (and therefore, having a common manufacturing requirement of use of sheet metal), and a sub-grouping of such shapes for hole punching using a common process (mechanical hole punching). For example, model division analyzer 252 would not group all these shapes together for $CO_2$ laser hole punching operations, because some sheet metals (such as copper) cannot be cut efficiently with a $CO_2$ laser. By way of further example, if the thickness of an identified shape is greater than 0.250," then it may be grouped with other shapes of similar thickness for water jet processing, because neither $CO_2$ lasers nor mechanical hole punchers will provide good results with most metals of such thickness. In yet another example, if a shape is determined to include one or more complex curves (referred to in SolidWorks as "Freeforms") then it may be included in a main group with other shapes having at least one complex curve, and may be included in a sub-group for $CO_2$ laser or water jet processing as applicable to a starting material identified to support bending/deforming operations required to create the complex curve of the detected geometry. Model division analyzer 252 would not include shapes with complex curves in a group of shapes for mechanical punching. Note, to determine if there are any shapes with complex curves, interrogator 220 identifies each Face of an identified shape, and each Edge thereof. Based on identified Edges, interrogator 220 then searches for splines (surfaces with curvatures defined by one or more polynomial functions) or other curved surfaces, using code such as that set forth below:

```
foreach (var facein Faces)
    {
        varedges=face.GetEdges( )asobject[ ]; foreach
        (!Edge edge in edges)
        if(edge.GetCurveParams3( ).CurveType!=
        (int)Const.swCurveTypes_e.CIRCLE_TYPE)
        {
```

-continued

```
            HasFreeFormedCuts= True; break;
        }
            else
        {
            HasFreeFormedCuts    True;
            break;
        }
    }
}
```

The foregoing code statements are listed by way of example only, other code statements or sequences could be used. If any splines or other curved surfaces are found, then the corresponding shape is identified as including a complex curve.

As a result, model division analyzer 252 may group related shapes together, as a function of geometric aspects thereof that indicate common starting materials and common processes, in groupings and sub-groupings that are stored in manufacturing database 254. During subsequent operations of supplier evaluation module 223 as described above, one or more of modules 226-248 thereof may then execute their respective processes as described above divisions or groupings of processes as stored on manufacturing database 254, on a division-by-division basis (as opposed to being conducted on 3D computer model 216 as a whole, per an embodiment as illustrated in FIG. 2A).

Figure 4A:
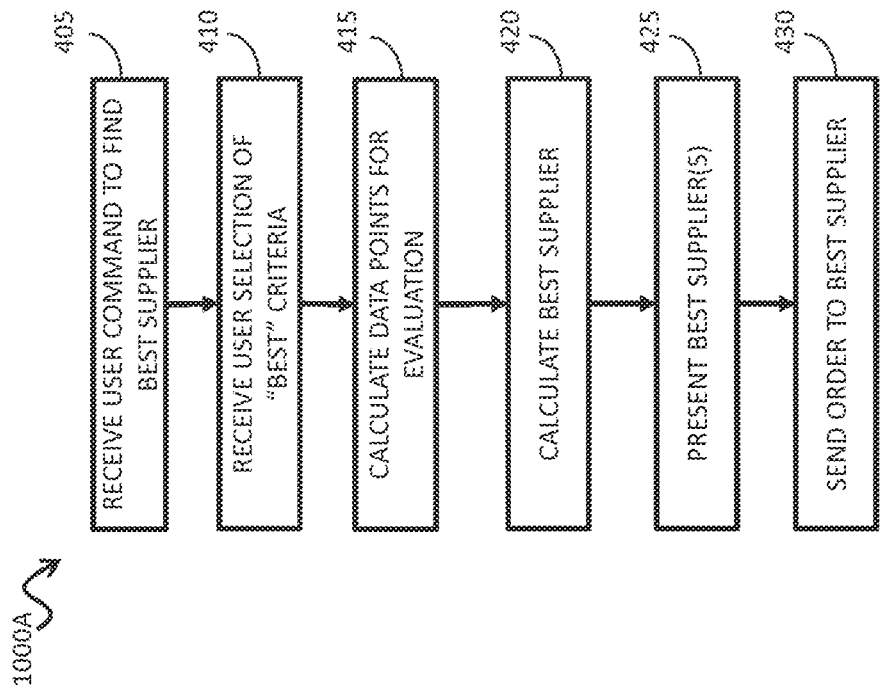
FIG. 4A is a more detailed flowchart of the method of FIG. 1A.

FIG. 4A illustrates a more detailed method 1000A corresponding to supplier-correlation method 100A of FIG. 1A. As a user interacts with modeling software program 200A of FIG. 2A (via GUI 212 to input Data A that is used to create the 3D computer model 216 for a product to be manufactured), such user may also input data on one or more variables. These variables may include, by way of example and not limitation, one or more of quantity, requested delivery options (carrier, regular turnaround time versus expedited, etc.), requested maximum distance between the supplier and a user, quality, and surface finishing options for the designed product. Such data is provided through GUI 212 as Data B to supper evaluation module 223. In step 405 in FIG. 4A a user inputs a command to request identification of best supplier.

Either as part of a "identify best supplier" command or the like, or in a separate step 410, a user may be presented with a screen on GUI 212 to indicate the relative importance of presented variables. Note that this option may be expressed as base "may have" requirements or as higher priority requirements relative to other requirements, or both. By way of example and not limitation, a user may desire to receive manufactured product four weeks from order placement. While receiving shipment earlier than four weeks from order placement may be helpful, it is not required. In this case, a user may indicate that a "lead time" of three weeks is preferred, and a "lead time" of four weeks is required. Similarly, a user may decide that delivery time is more important than manufacturer quality. A user may enter such preferences and requirements in GUI 212, indicating preferred versus essential values for delivery and quality of manufacturer, respectively. This data may be provided as part of Data B to supper evaluation module 223. As will be apparent to persons of ordinary skill in the art, other variables (such as those discussed above relative to the calculation module 223 of FIG. 2A) may be included in this step of user preference indication.

The base approach to determine expedited lead times, where "12/11/10" presents the three different options for providing expedited lead times in accordance with different embodiments of the present disclosure. For example, the base lead time may be reduced from 7 days to 5 days. This would result in a 2-day reduction in overall lead time, from 13 days to 11 days, assuming no other components of lead time are reduced. In one example, the five-day lead time may result from the manufacturer giving preference to the production of these products as compared to other products, such that total base lead time closer approximates raw process time. In another example, base lead time may average 4 days, so the manufacturer may simply allocate a base lead time of 5 days to the production of these products. In some embodiments, the additional time due to quantity may be reduced from 3 days to 2 days. This would result in a one-day reduction in overall lead time, from 13 days to 12 days (box 202E), assuming no other components of lead time are reduced. This reduction of 3 days to 2 days can be accomplished the same way base lead time was reduced per the example above. Finally, in some embodiments of the present disclosure, base lead time may be reduced (from 7 to 5 days) and additional time due to quantity may be reduced (from 3 days to 2 days). This would result in a 3-day reduction in overall lead time, from 13 days to 10 days, assuming no other components of lead time are reduced. Note that in this example, additional time due to silk screening and chromate plating are the same as the standard times, respectively. This simply indicates that some processes may not be subject to expediting, either due to third party suppliers or due to special requirements for the process in question.

In some embodiments, one or more of the additional processes can be expedited along with base lead time and normal delays due to quantity/load. Note also that a variety of methodologies may be applied to reconcile these different amounts of lead time reductions with different payment schedules. So, in its simplest form, a expedite option payment of $X may entitle the customer to a three-day reduction in lead time. Alternatively, the payment of $X might qualify the customer for a "standard" lead time reduction of two days (in other words, a reduction in just the base lead time 204), and a premium payment of $Y (e.g., either on some periodic basis and/or on a product by product ordering basis) may qualify the customer for an additional reduction of one day (e.g., by adding the one day reduction due to quantity 206). Other combinations of payments and corresponding reductions are possible, as will be explained in more detail below.

Method 1000A then proceeds to step 415, in which data calculations (as were described above with reference to FIG. 2A) are conducted to generate data that may be compared to corresponding data from supplier information database 205. This process is discussed in more detail with reference to FIG. 5A. Based on these data comparisons, a "best supplier" is calculated in step 420 (FIG. 4A), the details of which will be described below with reference to FIGS. 6 and 7. Finally, identifying information for an identified best supplier is presented to a user in step 425, and optionally an order is placed by a user to the chosen supplier in step 430. Identifying information may include a display of comparisons between all or a subset of requested user data and prioritization (Data B) from a user, and corresponding data for the designated best supplier. In an alternative embodiment, data to be displayed is specified by a user by submission of commands at GUI 212.

Figure 4B:
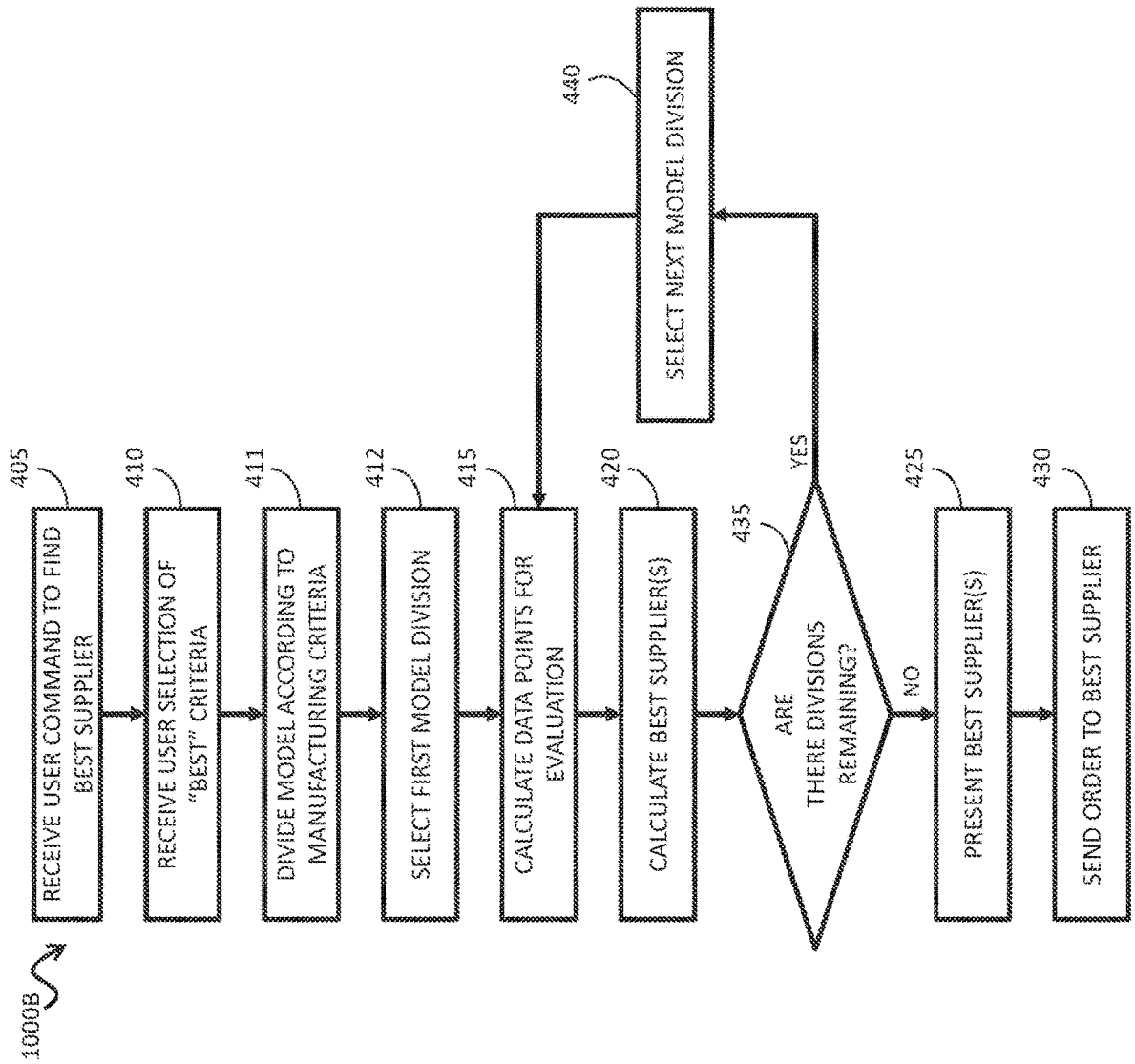
FIG. 4B is a more detailed flowchart of the method of FIG. 1B.

FIG. 4B illustrates a more detailed method 1000B corresponding to supplier-correlation method 100B of FIG. 1B. In the description to follow, elements that are similar to those described above with reference to FIG. 4A are indicated with the same reference numerals. In accordance with this alternative method, the data entry, data calculations, and best supplier determinations described above with reference to FIG. 4A are conducted for given grouping of 3D computer model shapes, such groupings being determined as described above with reference to FIG. 2B. Accordingly, after carrying out steps 405 and 410 as described above in step 411, 3D computer model 216 is parsed by interrogator 220 to create divisions and groupings of related structures and process steps as described above with reference to FIG. 2B. Steps 415 and 420 are similar to corresponding steps described above with reference to FIG. 3A, except in this method 1000B these steps are conducted for a division of related structures (and associated process steps). At step 435, manufacturing process database 254 is queried to determine if there are any remaining model divisions to be processed, and if so, at step 440 a remaining model division is selected for analysis in step 415 and best supplier identification in step 420. At step 425 a best supplier may be identified for each model division, and at step 430 manufacturing orders may be placed with identified best suppliers, as described above with reference to FIG. 4A.

Figure 5A:
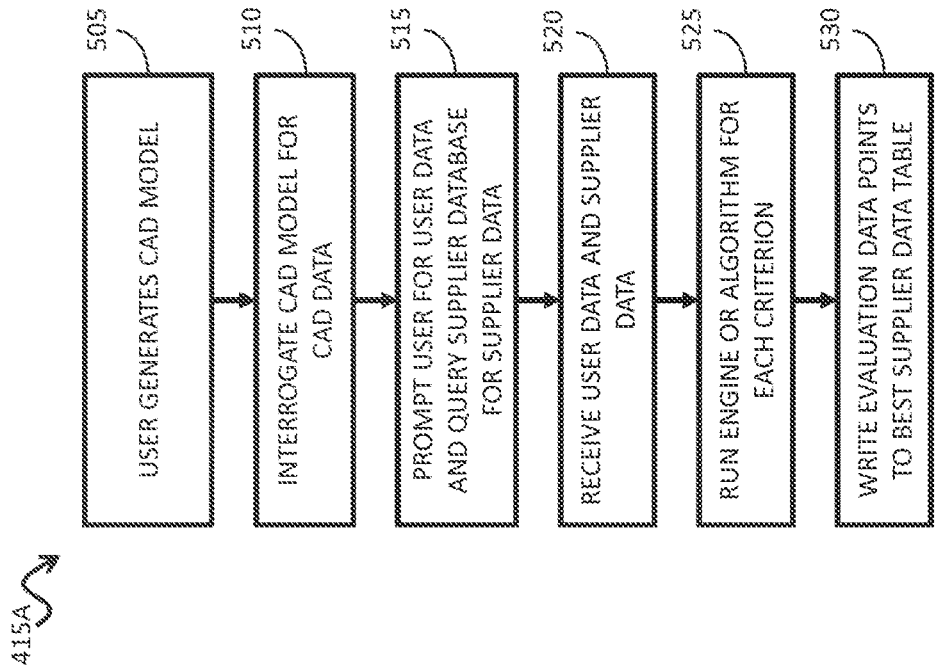
FIG. 5A is a more detailed flowchart for step 415 of FIG. 4A.

FIG. 5A illustrates a more detailed process 415A for step 415 of FIG. 4A. First, in step 505 a user creates a 3D computer model 216 for a product to be manufactured, as previously described. At step 510 interrogator 220 parses 3D computer model 216 to generate Data C, as previously described, and the resultant data is loaded into best supplier data table 260 (illustrated as column 610 "Data C CAD Data" of FIG. 6). At step 515 process 415 causes GUI 212 to present an interface by which a user may input preferences and other user data, as previously described. Also as part of step 515, process 415 causes supplier data to be queried from the suppler information database 205. In step 520, process 415 causes best supplier data table 260 to be loaded with received user data (column 615 of FIG. 6) and received supplier data (column 620 of FIG. 6). a user. In step 525 of process 415 one or more comparison algorithms are executed by supplier evaluation module 223 for each criterion, as described in more detail below, and in step 530 calculated evaluation data points are written to best supplier data table 260.

Figure 5B:
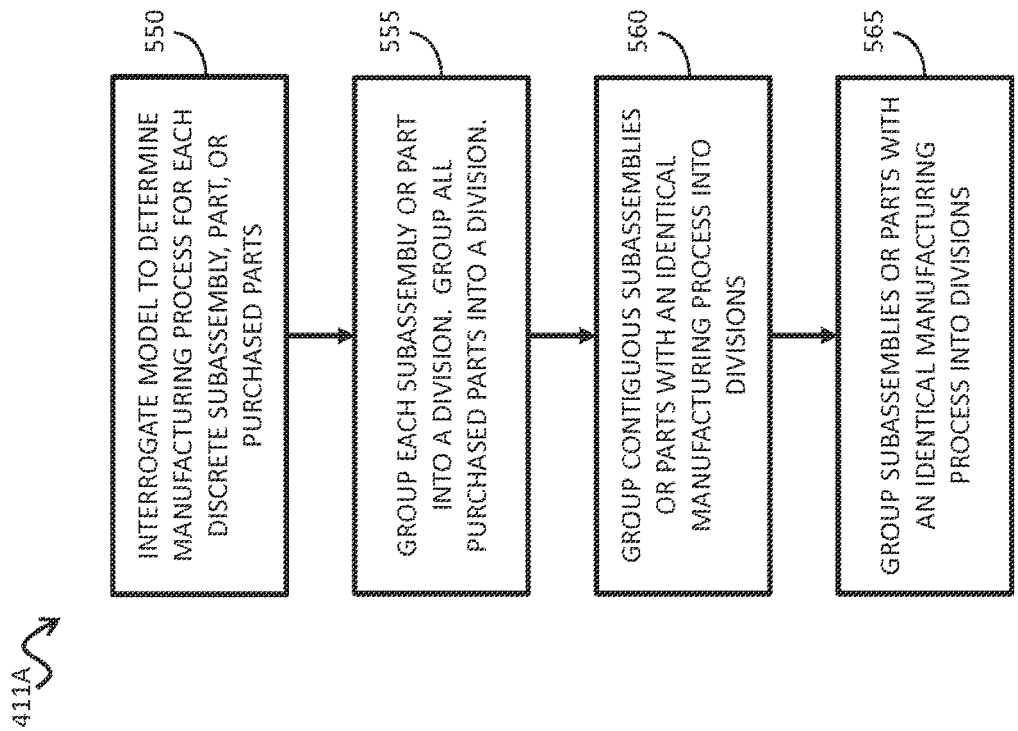
FIG. 5B is a more detailed flowchart of step 411 of FIG. 4B.

FIG. 5B illustrates a more detailed process 411A for step 411 of FIG. 4B. In step 550, interrogator 220 parses 3D computer model 216, and model division analyzer 252 identifies discrete sub-assemblies, parts, or purchased parts, as well as associated processes. By way of illustration and with reference to FIGS. 3A and 3B, during step 550 model division analyzer 254 may divide 3D computer model 216 into main groups, by identifying workpiece 340 as a single shape to be processed, and front side 316, hinges 319, 322, and pull 325 as purchased parts. Model division analyzer 252 may associate process steps with each of these sub-assemblies, parts, or purchased parts. In step 555 each subassembly and part may be assigned its own division (or group), and all purchased parts are grouped together. Then, in step 560 contiguous subassemblies or parts may be grouped together if they have common processes, and in step 565 subassemblies or parts may be grouped together if they have common processes (without a requirement of being contiguous, was required in step 560).

FIG. 6 illustrates a portion of exemplary data stored by in best supplier data table 260 of FIG. 2A. While all the data described below is discussed as being written to and read from best supplier database 260, other data storage configurations or architectures may be used. By way of example and not limitation, data from supplier information database 205 is not required to be re-stored in best supplier data table 260. Each row refers to a different evaluation criterion, as listed in the first column 605. Column 610 is information from Data C (CAD data) applicable to each listed criterion in a corresponding row, as discussed above with respect to FIG. 5A. Column 615 is information from Data B (user data) applicable to each listed criterion in a corresponding row, as discussed above with respect to FIG. 5A. Column 620 is information from supplier information database applicable to each listed criterion in a corresponding row, as discussed above with respect to FIG. 5A, for each supplier Supplier 1, Supplier 3 . . . Supplier n. The next column 625 characterizes the algorithm to be run (or determination to be made) for the criterion in question. General examples of such algorithms are discussed above; see the discussion of pricing module 226 for more specific examples. Columns 630A-630N illustrate the results of the determination for each supplier, for which applicable information is written to the best supplier data table 260. The respective data, and calculations, for each criterion in column 605 may now be described in more detail below.

In the case of the complexity module 229 of supplier evaluation module 223, as indicated by applicable entries in column 610, information from Data C that is applicable to shipping module 238 includes number of manufacturing production operations, or steps, required to produce the designed product. In typical operation no data is required directly from a user (Data B) for evaluation of this criterion. However, the system of the disclosure may be modified such that a user is given the option of providing a number of steps (if that information may be otherwise difficult for interrogator 220 to otherwise extract from 3D computer model 216). As indicated by applicable entries in column 620, information from supplier information database 205 used by complexity module 229 may include total number of manufacturing steps a given supplier is capable of providing, e.g. their total capacity in a given unit of time. Other similar sorts of manufacturing constraints may be represented here, such as the total number of units per day of product the manufacturer is capable of producing. As indicated by the corresponding entry in column 625, complexity module 229 then simply compares these two totals and writes the results of the comparison to corresponding entries per supplier 630A, 630B . . . 630N in best supplier data table 226.

In the case of the capability module 232 of supplier evaluation module 223, as indicated by applicable entries in column 610, information from Data C may include manufacturing operations, or steps, required to produce the designed product. Again, while in a typical operation no data is required from a user (Data B), the system of the disclosure may be modified such that a user is given the option of listing the types of operations required to manufacture the designed product, if that information may be otherwise difficult for interrogator 220 to otherwise extract from the 3D computer model 216. As indicated by applicable entries in column 620, information from supplier information database 205 may be types of manufacturing steps the supplier is capable of providing. Note that a separate row 232A is shown, illustrating a specific case of required finishes. By way of example and not limitation, in the case of a CAD design for a metal part, Data C parsed from 3D computer model 216 may not indicate a particular finish (as such, no data entry for column 610 appears for row 232A). A user may select from a variety of finishing options (such as, by way of example and not limitation, a buff finish, a plated finish, a roughened surface, etc.) and identify a desired option as part of Data B (user data). This data is indicated at column 615 for capability 232A. This selected option may then be compared to the listed capabilities of the suppliers who have provided that data in the supplier information database 205. Capability module 232 compares these lists of required types of processes to manufacture the design to the types of processes each manufacturer is capable of supplying, and capability module 232A compares the required finishing options to what each manufacturer is capable of supplying. These determinations are as indicated in the "Algorithm" column 625. The capability modules 232, 232A then write the results of the comparison to corresponding entries per supplier in the columns 630A-630N of best supplier data table 260.

With reference to the quality module 235 of supplier evaluation module 223, no information may be required from Data B or Data C. Instead, quality module 235 receives inputs from the supplier database 205 for each supplier, on the basis of a relative quality measurement of the suppliers, as described above. As noted above, by way of example and not limitation this may be expressed as a rating from 1-6, 6 being the highest quality. This data may simply be set forth for each supplier in the supplier information database 205 and may be written into corresponding entries of best supplier data table 260.

With continuing reference to shipping module 238 of supplier evaluation module 223, as indicated by applicable entries in column 610, information from Data C that is applicable to shipping module 238 includes dimensions and weight of the product to be manufactured. As indicated by applicable entries in column 615, information from Data B that is applicable to shipping module 238 includes shipping type (air, ground, etc.), requested maximum distance from supplier to user, and information indicating a user is eligible for one or more shipment discounts from one or more carriers. As indicated by applicable entries in column 620, information from supplier information database 205 that is applicable to shipping module 238 includes the number and type of carriers with which it does business that may ship a package of specified size and weight. As indicated by applicable entries in column 625, shipping module 238 counts up the number of carriers a given supplier is associated with that are capable of shipping a package of this specified size and weight. In alternative embodiments, Data B may include a user-specified shipment package. The shipping module 238 then writes these results to corresponding entries per supplier in the columns 630A-630N of best supplier data table 260.

In the case of lead time module 241 of the supplier evaluation module 223, each supplier's capability to provide a reduced lead time to manufacture the designed article is determined, and results for each supplier are compared. In a first exemplary embodiment, expedited lead time options are procured by users, and applied to applicable products by deriving process requirements from the CAD data (Data C) and comparing those requirements to applicable process and lead capabilities of different suppliers. In accordance with this first embodiment, the number and type of production operations required to manufacture a product in question is identified from Data C (row 610), and requested quantity plus expedited production option(s) chosen by a user for particular manufacturing operations are identified from Data B (row 615). This data is compared to data from supplier information database 205 indicating the expedited production options offered by each supplier, as well as the quantity (or capacity) for each production operation, and the resultant lead time is written to corresponding columns 630A, 630B . . . 630N of best supplier data table 260. In an alternative embodiment, a user provides expected lead times for manufacture of the final product, via Data B. In this second embodiment a user, required manufacturing processes are identified from Data C (row 610), and required overall lead time is provided by a user via Data B (row 615). This data is compared to data from supplier information database 205 indicating the expedited production options offered by each supplier, as well as the quantity (or capacity) for each production operation, and the resultant lead time is written to corresponding columns 630A, 630B . . . 630N of best supplier data table 260.

By way of example and not limitation, assume manufacturing of the designed product (as either indicated by the 3D computer model 216, or as indicated by a user) entails a cutting action, followed by four drilling actions (4 holes). A user indicates a desired production quantity of 2000 units and indicates a desire to receive the units within four days of the placement of the order (by expediting the cutting operation). The supplier information database 205 may indicate expedited cycle times (expressed as capacity per day) they may support for the chosen expedited operation (cutting), and their regular cycle times (again expressed as capacity per day) for their other process operations. For the sake of illustration, assume Supplier 1 may do an expedited cutting operation of 2000 parts per day, and may drill one hole for 4000 parts per day; Supplier 2 may do an expedited cutting operation of 500 parts per day, and may drill at the same rate as Supplier 1; and Supplier N may do an expedited cutting operation of 750 parts per day, and may drill at the same rate as the other two suppliers. In this particular example, and assuming these lead times include both set-up and run-time factors, the lead time module 241 may list these respective throughputs, and calculate total lead time of 1 day for Supplier 1, 4 days for Supplier 2, and 3 days for Supplier N. The result of this analysis, expressed as the number of days it may take the supplier to manufacture and ship the resultant product (by way of example and not limitation; other ways of expressing this data may be used) is written to corresponding portions of best supplier data table 226.

In the case of the logistics module 244 of the supplier evaluation module 223, suppliers' respective capabilities individually or collectively to supply the product at the lowest price (including logistics) may be assessed. In an embodiment of the disclosure, logistical comparative costs are derived from the CAD data (Data C) utilizing methods and structures as set forth in U.S. patent application Ser. No. 14/275,116, filed on May 12, 2014, and titled "Methods and Software For Enabling Logistical Functionality In An Electronic Pricing System" ("the '116 application") which is incorporated by reference herein for its teachings of logistical functionality in ecommerce marketplace systems. In alternative embodiments made in accordance with the present disclosure, the suppliers directly provide logistical costs. In the case of the embodiment of the disclosure in accordance with the '116 application, the number and type of production operations that are needed to create the structure are extracted from Data C, and the quantity of units to be produced is provided by a user as Data B. In the alternative embodiment of the disclosure, the number and type of production operations that are needed to create the structure are provided by a user as part of Data B. In either embodiment, this data is compared to data from supplier information database 205 indicating shipping prices for the supplier itself as well as shipping (and related logistical information, as applicable) of their contractors. Logistics module 244 may then determine variance in total price as a function of this contractor information.

By way of example and not limitation, again assume manufacture of the designed product (as either indicated by the 3D computer model 216, or as indicated by a user) entails a cutting action, followed by four drilling actions (4 holes). A user sets the required quantity at 1000 units. The supplier information database 205 indicates Supplier 1 may provide the cutting process for $3/unit, and they have a third party drilling contractor who may perform the drilling process for $1/unit, and shipment of 1000 units between Supplier 1 and its contractor may cost $200 (as derived by logistics module 244, or by shipping module 238 as described above). In this example, both Supplier 2 and Supplier 3 may provide the cutting process for $3/unit and the drilling process for $2/unit, all in-house. In this case, logistics module 244 may first determine that a supply of product from Supplier 1 may require use of its contractor, and may determine (or cause shipping module 238 to determine) what additional shipping cost may be required to enable the contractor's involvement. Furthermore, if the drilling operation conducted by the contractor is the last manufacturing operation for the product, such that final product shipment to a user may originate from this contractor, shipping module 238 may determine what shipping cost may be from the contractor to a user. 1 should be increased by $200. The result of this analysis, expressed as (by way of example and not limitation, other ways of expressing this data may be used) the addition to total price by using Supplier 1's integrated solution, is written by logistics module 244 to corresponding entries per supplier in the best supplier data table 260. An alternative way to express the data is by listing Supplier 1's base price for cutting, Supplier 1's base price for drilling, their contractor's base price for drilling, and logistics price for shipping to and from their contractor.

In the case of the pricing module 226 of supplier evaluation module 223, suppliers' respective prices to supply the product are assessed. In an embodiment of the disclosure, prices are derived from the CAD data (Data C) utilizing methods and structures as set forth in the description above, as well as alternative embodiments as set forth in the '033 application and the '773 application, both noted above. The number and type of production operations that are needed to create the modeled product are provided by interrogator 220 as part of Data C, and the quantity of units to be produced is provided by a user as Data B. This data is used to read applicable unit process cost data from supplier information database 205, and prices are calculated therefrom. By way of example and not limitation, again assume manufacture of the designed product (as either indicated by the 3D computer model 216, or as indicated by a user) entails a cutting action, followed by four drilling actions (4 holes). Again assume a user requests 1000 units. The supplier information database 205 indicates Supplier 1 may provide the cutting process for $0.50/unit and the drilling process for $1/unit; Supplier 2 may provide the cutting process for $0.50/unit and the drilling process for $1.50/unit; and Supplier N may provide the cutting process for $0.35/unit and the drilling process for $1.50/unit. The pricing module 226 may then calculate the total cost ($1.50/unit for Supplier 1, $2.00/unit for Supplier 2, and $1.85 per unit for Supplier N) and write the corresponding entries per supplier into the best supplier data table 260 (by way of example and not limitation; other ways of expressing this data may be used). Note that there is an overlap between the functions of logistics module 240 and pricing module 222A, in that both utilize an input from Data C to determine price information. In the depicted embodiment, logistics module 244 provides prices in situations in which a given supplier is relying on another supplier for some of the required manufacturing and shipping operations, while pricing module 226 provides prices for overall manufacturing and shipping from individual supplier with no reliance on their suppliers. In an alternative embodiment of the disclosure logistics module 244 may provide the function of pricing module 226 as part of its function as described above. In another embodiment of the disclosure the pricing module 226 may be used in combination with shipping module 238 to provide the results set forth above for logistics module 244.

Figure 7:
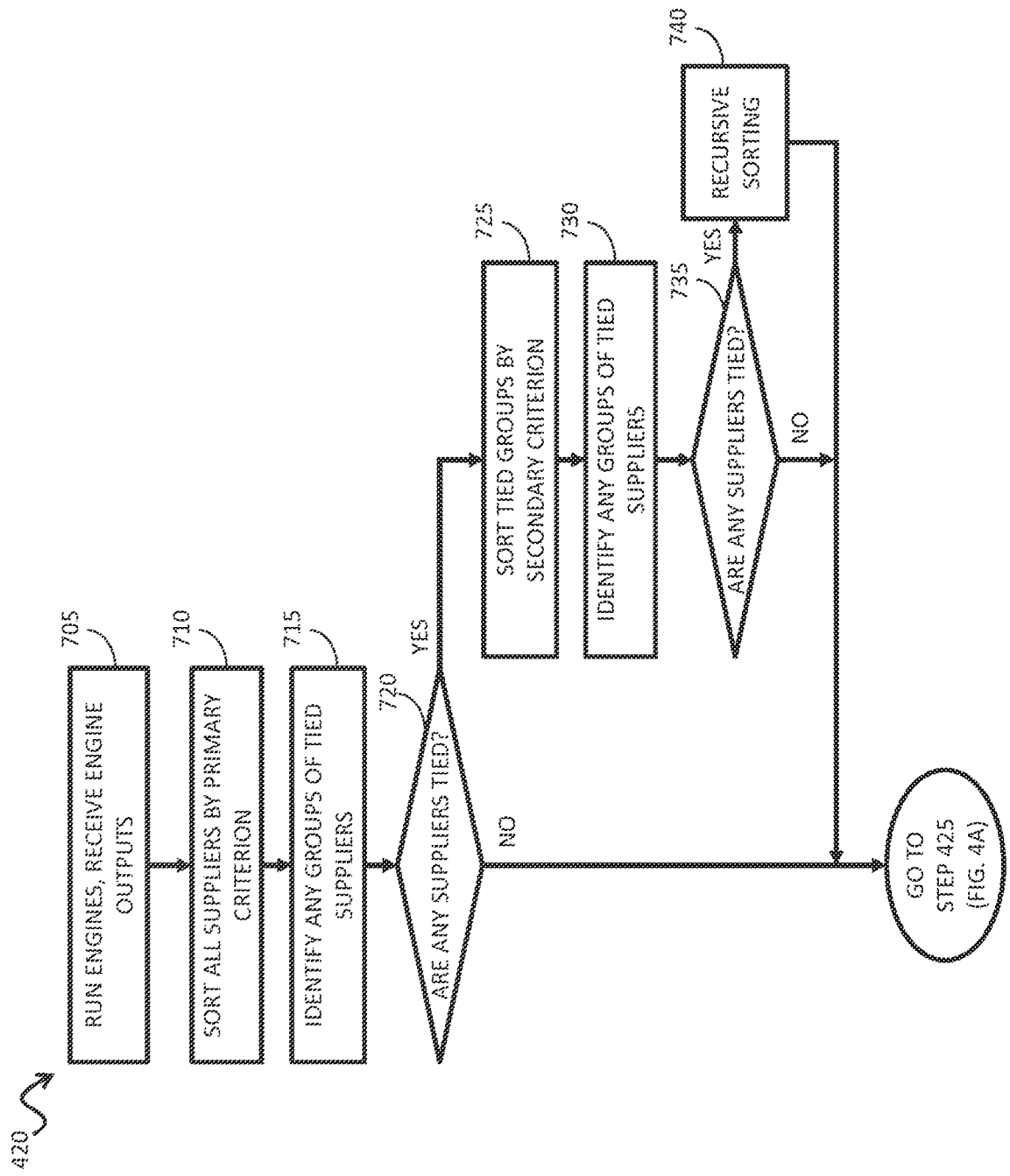
FIG. 7 is a more detailed flowchart of step 420 of FIG. 4A in accordance with a first embodiment.

FIG. 7 illustrates a more detailed view of step 420 of FIG. 4A in accordance with a first embodiment. In step 705, the various calculations of one, some, or all of modules 226-244 of supplier evaluation module 223 are executed as described above. As discussed above results of these calculation are stored as applicable entries in best supplier data table 260. In step 710 supplier results are read out of the supplier data table 223 and compared based on the single most important criterion selected by a user (typically price per unit). The results are sorted, in this case from lowest to highest price. A user may select to view resulting data based on selected sorted criterion, as well as other criterion (such as results from logistics module 244, indicating additional logistics costs). Alternatively, one or more criteria related to a selected criterion may pre-selected by the disclosed system for display. In this case, if a user selects price per unit as a primary sorting criterion, logistics information from module 244 may be automatically displayed, since that data relates to overall costs.

If any group (two or more) of suppliers are tied based on the primary criterion, in step 715 the disclosed system may perform an automatic sorting operation based on additional criteria of importance as indicated by a user. In step 720, if there is no tie, method 420 identifies the selected supplier to a user (step 425 in FIG. 4A). For the purpose of further discussion, assume in this example a user has selected finishing options is the single most important criterion. As set forth in FIG. 6, two suppliers (Supplier 1 and Supplier N) may both supply the required finish. The method 420 as shown in FIG. 7 indicates, at step 720, that these two suppliers are tied based on the primary criterion. Accordingly, in step 725, suppliers may then be ranked in accordance with the criterion a user indicates is the next most important. Continuing with the example, assume the next most important criterion is complexity, as determined by complexity module 234. As a result, complexity data associated with Supplier 1 and Supplier N are compared, and at step 730 in FIG. 7 the disclosed method identifies if any suppliers remain tied. If a group of suppliers remains tied (as they may be here, since both also have a "Y" for the complexity determination as indicated in FIG. 6) the process of steps 720 through 730 repeats itself for additional sorting criteria selected by a user. In this case, if the next sorting criterion selected by a user is price per unit, step 725 may determine that Supplier 1 has a lower price per unit, and that supplier may be identified as the best supplier at step 325 of FIG. 3A. In an extreme example where a large number of criteria are applied and suppliers remain tied, recursive sorting 740 may be employed to break the tie. Here we may use annual revenue of the supplier (to sort by size), name of the supplier (to sort alphabetically), location of the supplier (again to sort alphabetically), or other miscellaneous factors pertaining to the suppliers that do not directly reflect their relative capabilities to supply the product in question.

As an alternative to step 740, aa user may wish to see suppliers that are tied through whatever criteria they choose. A user may be presented with an option to list all suppliers that remain tied though application of a given priority level of criteria. In that case, once a tie remains through application of that given priority level of criteria, the process may discontinue, and the tied suppliers may be identified to a user. So e.g. with reference to FIG. 6 and the example above, in this embodiment of the disclosure a user may submit instructions or indicate a desire to see all ties after applying the two most important criteria. In the example above, Supplier 1 and Supplier N may be identified to a user, because they are tied through application of the two most important criteria (finish and complexity). At that point, a user may select the best supplier based on one, some, or all of additional data for each supplier, without additional analysis from the disclosed system.

Figures 8A, 8B, 8C:
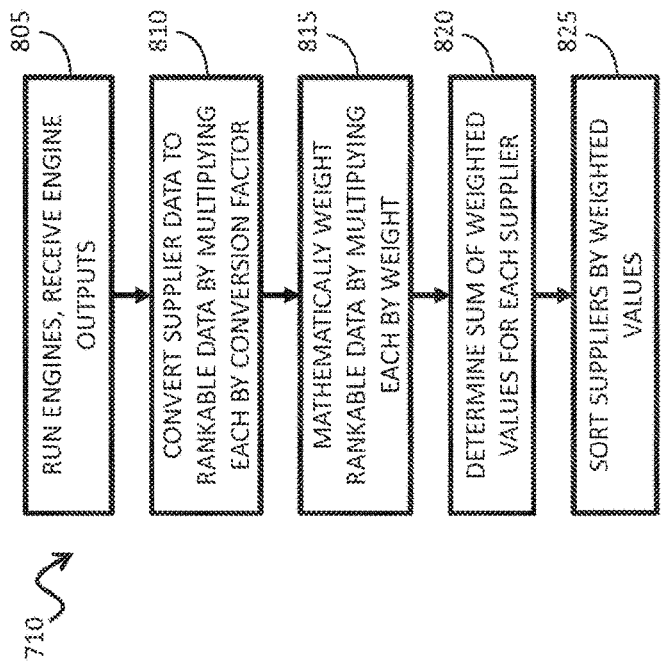
FIG. 8A is a flowchart of an alternative embodiment of step 710 of FIG. 7.
FIG. 8B illustrates a portion of exemplary data stored in the conversion table of FIG. 2A.
FIG. 8C illustrates a portion of exemplary data stored in the weighting table of FIG. 2A.

FIG. 8A illustrates an alternative embodiment of step 710 of FIG. 7. This embodiment utilizes the conversion table 263 and weighting table 266 described above with reference to FIG. 2A. In step 805, the various calculations of one, some, or all of modules 226-244 of supplier evaluation module 223 are executed as described above. As discussed above results of these calculation are stored as applicable entries in best supplier data table 260. In step 810, the resultant data is read out from the data table 260, and the data for selected criterion is converted into equivalent units by application of respective conversion factors. Conversion factors are assigned to each criterion based on the units of the raw data and a conversion factor to convert into an equalized value. The conversion factors may be set by a user or may be established by the vendor of the software of the disclosure. FIG. 8B illustrates a portion of exemplary data stored in conversion table 263 of FIG. 2A. Note that the first criterion listed is "quality." The units of the "raw data" is number of stars; in practice, any numerical indicator may be used. The conversion factor listed (25) is set such that a desired default value, or "floor," for selection (say 4 stars in a 5 star rating system, low quality to high quality) yields a relative value (or "score") of 100 (=4 stars×25 conversion factor). This same approach may be applied to other criteria, such as lead time (5 days desired default value, so the conversion factor is 20), distance (within 50 miles is the floor selection value, so the conversion factor is 2) and complexity (here, 100 steps is the floor selection value, so the conversion factor is 1). Note that the values of both the conversion factors and the resultant relative values are provided for ease of illustration. For some criterion where a lower raw number is better, the disclosed system applies inverses as conversion factors. By way of example and not limitation, for a lead time where 5 days is the floor for selection, and the lead time from a particular supplier is X, the conversion factor may be (5/X)(100), such that a 5 day lead time may yield a score of 100, a 6 day lead time may yield a score of 83, and a 4 day lead time may yield a score of 125. The resultant relative scores for each supplier may be stored in best supplier data table 260 of FIG. 2A.

Then, in step 815, weighting factor is applied to each criterion, as a function of relative importance. As discussed above, a user may select the order of importance of one or more of the criteria. In this embodiment of the disclosure, a user may either set weighting factors directly (to optimize the relative importance of the selected criterion), or a user may simply utilize preset weighting factors in the disclosed system. FIG. 8C illustrates a portion of exemplary data stored in weighting table 266 of FIG. 2A. In this embodiment of the disclosure, weighting factors are preset such that each factor is twice as important at next less important factor. As previously stated, a user may override these presets. So, by way of example and not limitation, assume Supplier 1 has a quality metric of 3 stars, and may provide a lead time of 4 days. So the assigned values resulting from step 810 in FIG. 8A for Supplier 1 for the quality metric may be 75, and for the lead time metric may be 125. Further assume that the designer has set quality as its most important criterion, and lead time metric as its next most important criterion. Using preset weighting factors listed in FIG. 7C, weighted values resulting in step 715 for quality may be 150 (75×2), and for lead time may be 125 (125×1). Resultant weighed scores for each supplier may be stored in best supplier data table 260 of FIG. 2A.

In step 820, resultant weighed values are read from best supplier data table 260 and are summed for each supplier, and in step 825 suppliers may be sorted by weighted values to determine the best supplier. In the example above, a summed value for Supplier 1 is 150+125=275. The same summation is made for other suppliers, with a supplier having a highest value being identified to a user. If there is a tie between suppliers, a tiebreaking process (such as set forth in steps 720-740 of FIG. 7) may be employed.

In accordance with the present disclosure, a supplier may be identified as a best supplier to manufacture a given product, based on data each supplier provides to a central system that may query 3D computer models to determine required manufacturing steps and other attributes associated with manufacture of the desired product, combined with user data indicating selected manufacturing options as well as delivery terms and related business-focused criteria. The disclosed system may determine best suppliers based on a 3D computer model for an entire product, or best suppliers for separate, integrated parts thereof. The disclosed system may enable a user to determine which criteria are most important and may enable a user to consider price effects of suppliers utilizing contracted services. The disclosed system may also enable a user to assign weighting values to a number of defined criteria.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as may be apparent to those of ordinary skill in the computer art. Appropriate software coding may readily be prepared by skilled programmers based on the teachings of the present disclosure, as may be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, by way of example and not limitation, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. By way of example and not limitation, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
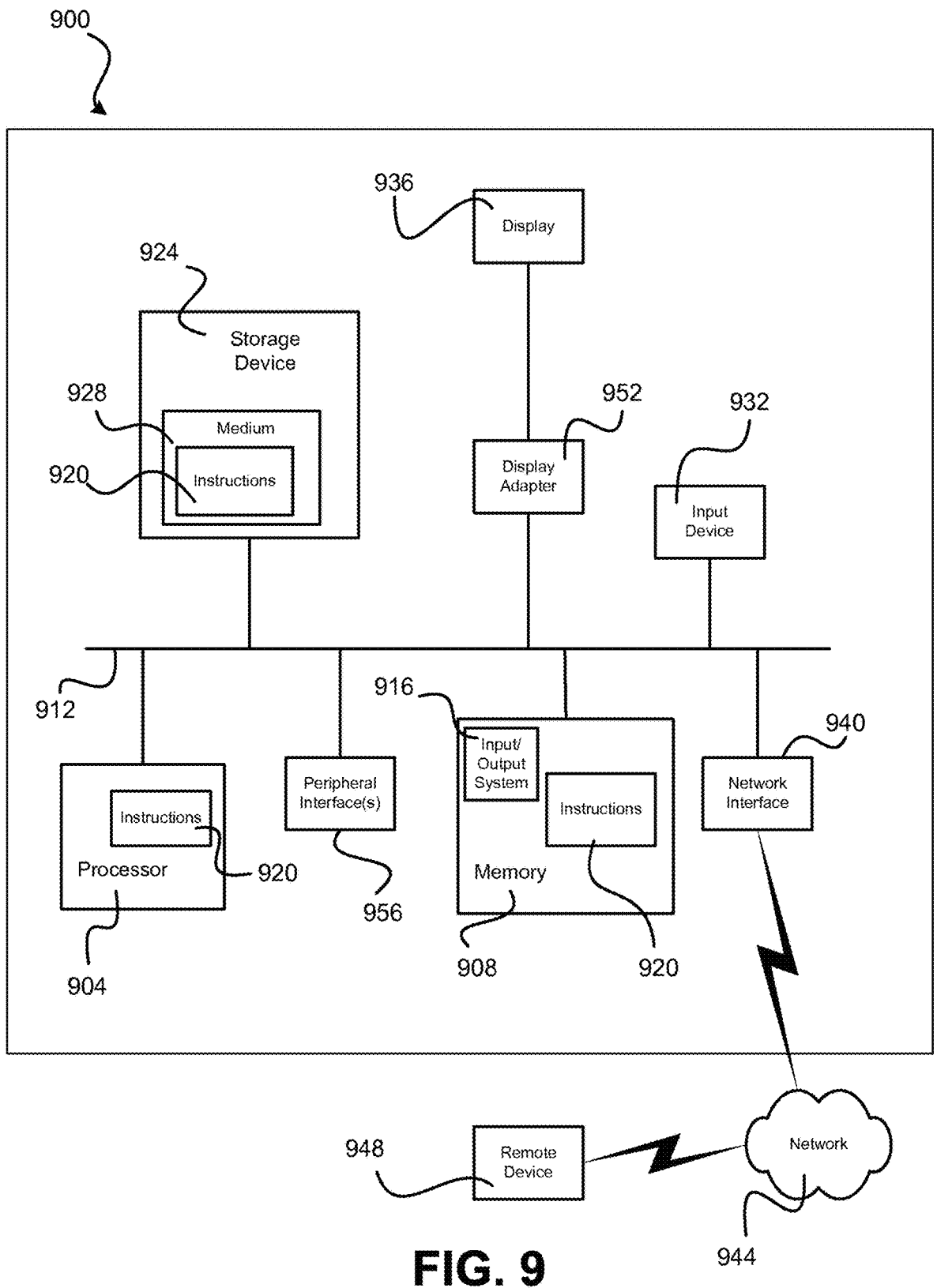
FIG. 9 is a diagrammatic representation of one embodiment of a computing device, which, when executing a set of instructions or computer modules such as those described herein, performs any one or more of the aspects and/or methodologies of the present disclosure as set forth herein.

FIG. 9 shows a diagrammatic representation of one embodiment of a computing device, in the exemplary form of a computer system 900, which when executing a set of instructions or computer modules (such as those shown in FIGS. 2A and 2B) may perform any one or more of the aspects and/or methodologies of the present disclosure as set forth above. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Memory 908 may include various components (e.g., machine readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

In operation, the supplier information database 205 and be stored on a storage device associated with the computer of FIG. 9 (such as in storage device 924) or on storage devices that are the same as those of storage device 924, except on a remote device 948 accessed through the network 944 via the network interface 940 (such as may be the case when using a cloud-based database solution as mentioned above with reference to FIG. 2). Alternatively, and as previously stated, the disclosure may be implemented in a software-as-a-service through a cloud connection, in which case a user may enter user input data 215 via a GUI 212 that is provided on a remote device 948, and where the remaining portions of the modeling software program 210 are resident on the storage device 924 of a central (cloud) server 900, and such that the inputs are supplied via network 944 and network interface 940 to a central server device 900, the inputs causing the processor to execute the program instructions of the disclosure that are resident in central storage 928.

The foregoing has been a detailed description of illustrative embodiments of the disclosure. Various modifications and additions may be made without departing from the spirit and scope of this disclosure. For example, while the disclosure has been described with reference to identifying a single "best supplier," the disclosure may be applied to identifying multiple suppliers to a user. In addition to the supplier information database 205 as described herein, other supplier-related information that in turn originates from their suppliers (such as logistics/carriers) may be included, either as part of database 205 or as separately supplied. In addition, while the disclosure has been described with reference to identifying the best supplier of a CAD design in conjunction with a CAD software program, the principles of the disclosure are applicable to other types of programs in which multiple suppliers are automatically ranked in accordance to specified criterion, including but not limited programs for enterprise resource planning (ERP), materials requirements planning (MRP), product lifecycle management (PLM), and customer relationship management (CRM) ordering systems. In other words, instead of being embedded in a modeling software program, the disclosure may be embedded in these other types of systems that manage production, such as the manufacture of apparel. Both sheet metal and apparel designers use CAD systems to design their products, using sheets of flat, material for manufacture. Design data, such as material choice, precise dimensions, or locations of additional features may be embedded within the digital design. Designers may choose different metals or fabrics (including non-woven materials such as leather) depending on the strength and other inherent properties of the material, which affects what manufacturing methods may be necessary to work the material. Purchased components (in some cases, identical purchased components) may be added to the design. modeling software programs may be used to visualize the shape of the finished product. In both sheet metal and apparel manufacturing the sheet (metal or fabric) may be cut or stamped by a variety of methods using computerized machines. Units are moved from station to station during manufacture. Where sheet metal is connected by rivets or welding, sheet fabric is connected by stitching or gluing. Surface finishes may be applied to both; both may be painted, silk-screened, or otherwise covered with a protective substance.

Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present disclosure. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this disclosure.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. A system for matching a computer-aided design (CAD) model with at least one supplier, the system comprising:
   a computing device configured to:
      receive, from a user, a computer-aided design (CAD) file representative of a structure to be fabricated;
      receive, using a graphical user interface (GUI), a plurality of user inputted preferences for manufacture of the structure to be fabricated, wherein the plurality of user inputted preferences includes at least a lead time and at least a quantity to be manufactured;
      receive an attribute data associated with a plurality of suppliers;
      determine a plurality of manufacturing requirements associated with the CAD model, wherein determining the plurality of manufacturing requirements includes:
         causing an interrogator operating on the computer system to parse a software model of the structure to be manufactured, wherein parsing the software model comprises:
            identifying a discrete shape from the software model as a function of computer assisted design (CAD) commands associated with the software model;
            wherein identifying the discrete shape comprises calculating, from a plurality of points on the software model, a position of a point of the plurality of points in a three-dimensional space;
         determining a manufacturing requirement for the product to be manufactured as a function of the identified shape, wherein the manufacturing requirement comprises CAD data and user data, the manufacturing requirement further comprising a number of manufacturing process steps;

and
  determining a second manufacturing requirement from the plurality of user-inputted preferences, wherein the second manufacturing requirement includes a pricing requirement;
  compare the attribute data to the first manufacturing requirement associated with the CAD model and the pricing requirement associated with the CAD model;
  determine a best supplier of the plurality of suppliers as a function of the comparison of the attribute data to the first manufacturing requirement and the comparison of the attribute data to the pricing requirement; and
  populate at least a portion of the GUI with information related to the selected supplier according to the user inputted preferences.

2. The system of claim 1, wherein the GUI is further configured to:
  receive a first user input identifying at least a first user-inputted preference as required; and
  receive a second user input identifying at least a second user-inputted preference as not required.

3. The system of claim 2, wherein the CAD file comprises a three-dimensional (3D) CAD model.

4. The system of claim 2, wherein the computing device is configured to perform a geometric analysis of the CAD file, and the GUI is configured to generate at least a field for inputting a user preference as a function of the geometric analysis.

5. The system of claim 1, wherein the attribute data comprises one or more capabilities of the at least a supplier.

6. The system of claim 1, wherein the attribute data comprises pricing of the at least a supplier.

7. The system of claim 1, wherein the attribute data comprises the constraints of the at least a supplier.

8. The system of claim 1, wherein the computing device is further configured to:
  perform a geometric analysis of the CAD file; and
  determine a manufacturing process for fabricating the structure as a function of the geometric analysis.

9. The system of claim 1, wherein the computing device is further configured to determine the best match as a function of an analysis of geometry of the structure to be fabricated.

10. The system of claim 1, wherein parsing the software model further comprises identifying at least a shape from the software model as a function of computer assisted design (CAD) commands associated with the software model.

11. A method of use for matching a computer-aided design (CAD) model with at least one supplier, the method comprising:
  receiving, at a computing device, a computer-aided design (CAD) file from a user, wherein the CAD file is representative of a structure to be fabricated;
  receiving, using a graphical user interface (GUI), a plurality of user inputted preferences for manufacture of the structure to be fabricated, wherein the plurality of user inputted preferences includes at least a lead time and at least a quantity to be manufactured;
  receiving, at the computing device, an attribute data associated with a plurality of suppliers;
  determining, at the computing device, a plurality of manufacturing requirements associated with the CAD model, wherein determining the plurality of manufacturing requirements includes:
    causing an interrogator operating on the computer system to parse a software model of the structure to be manufactured, wherein parsing the software model comprises:
      identifying a discrete shape from the software model as a function of computer assisted design (CAD) commands associated with the software model;
      wherein identifying the discrete shape comprises calculating, from a plurality of points on the software model, a position of a point of the plurality of points in a three-dimensional space;
    determining a manufacturing requirement for the product to be manufactured as a function of the identified shape, wherein the manufacturing requirement comprises CAD data and user data, the manufacturing requirement further comprising a number of manufacturing process steps;
  determining a second manufacturing requirement from the plurality of user-inputted preferences;
  comparing, at the computing device, the attribute data to the first manufacturing requirement associated with the CAD model and the pricing requirement associated with the CAD model;
  determining, at the computing device, a best supplier of the plurality of suppliers as a function of the comparison of the attribute data to the first manufacturing requirement and the comparison of the attribute data to the pricing requirement; and
  populating at least a portion of the GUI with information related to the selected supplier according to the user inputted preferences.

12. The method of claim 11, wherein the GUI is further configured to:
  receive a first user input identifying at least a first user-inputted preference as required; and
  receive a second user input identifying at least a second user-inputted preference as not required.

13. The method of claim 12, wherein the CAD file comprises a three-dimensional (3D) CAD model.

14. The method of claim 12, further comprising performing a geometric analysis of the CAD file, and the GUI is configured to generate at least a field for inputting a user preference as a function of the geometric analysis.

15. The method of claim 11, wherein the attribute data comprises one or more capabilities of the at least a supplier.

16. The method of claim 11, wherein the attribute data comprises the pricing of the at least a supplier.

17. The method of claim 11, wherein the attribute data comprises the constraints of the at least a supplier.

18. The method of claim 11, further comprising:
  performing a geometric analysis of the CAD file; and
  determine a manufacturing process for fabricating the structure as a function of the geometric analysis.

19. The method of claim 11, wherein the computing device is further configured to determine the best match as a function of an analysis of geometry of the structure to be fabricated.

20. The method of claim 11, wherein parsing the software model further comprises identifying at least a shape from the software model as a function of computer assisted design (CAD) commands associated with the software model.

* * * * *